US012046209B2

(12) United States Patent
Kim et al.

(10) Patent No.: US 12,046,209 B2
(45) Date of Patent: Jul. 23, 2024

(54) DISPLAY DEVICE AND LIGHT SOURCE DEVICE THEREOF

(71) Applicant: SAMSUNG ELECTRONICS CO., LTD., Suwon-si (KR)

(72) Inventors: Sungyeol Kim, Suwon-si (KR); Chunsoon Park, Suwon-si (KR); Kyehoon Lee, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/215,027

(22) Filed: Jun. 27, 2023

(65) Prior Publication Data
US 2023/0335071 A1    Oct. 19, 2023

Related U.S. Application Data

(63) Continuation of application No. PCT/KR2021/020152, filed on Dec. 29, 2021.

(30) Foreign Application Priority Data

Feb. 26, 2021   (KR) .......................... 10-2021-0026499

(51) Int. Cl.
G09G 3/34    (2006.01)

(52) U.S. Cl.
CPC ...   G09G 3/3426 (2013.01); G09G 2320/0233 (2013.01); G09G 2320/041 (2013.01)

(58) Field of Classification Search
CPC ............... G09G 3/3426; G09G 3/3607; G09G 2320/062; G09G 2320/0626
See application file for complete search history.

(56) References Cited

U.S. PATENT DOCUMENTS 8,104,945 B2    1/2012   Kim et al.
8,629,619 B2    1/2014   Clauberg et al.
(Continued)

FOREIGN PATENT DOCUMENTS

JP    2013-200327 A    10/2013
JP    5448981 B2       3/2014
(Continued)

OTHER PUBLICATIONS

International Search Report (PCT/ISA/210) issued by the International Searching Authority on Apr. 21, 2022 in corresponding International Application No. PCT/KR2021/020152.

Primary Examiner — Sardis F Azongha
(74) Attorney, Agent, or Firm — Sughrue Mion, PLLC

(57) ABSTRACT

A display device includes a liquid crystal panel; a plurality of light sources configured to emit light toward the liquid crystal panel, wherein the plurality of light sources are divided into a plurality of dimming blocks, each dimming block including one or more light sources; a driver configured to provide a current to each light source of the plurality of light sources; and a processor configured to: control the driver to provide the current to the one or more light sources included in each dimming block of the plurality of dimming blocks based on image data, obtain an average current value of currents provided to the one or more light sources included in each dimming block of the plurality of dimming blocks for a reference time based on the image data, and control the driver to provide a reduced current to the plurality of light sources based on at least one of a predetermined number of first dimming blocks or an arrangement of the first dimming blocks having the average current value being greater than or equal to a first reference current value.

12 Claims, 17 Drawing Sheets

(56) References Cited

U.S. PATENT DOCUMENTS

| | | |
|---|---|---|
| 8,780,034 B2 | 7/2014 | Kimura |
| 9,105,219 B2 | 8/2015 | Nishino et al. |
| 9,715,849 B2 | 7/2017 | Fujii |
| 9,830,869 B2 | 11/2017 | Im et al. |
| 9,870,740 B2 | 1/2018 | Park et al. |
| 10,971,057 B2 | 4/2021 | Jung et al. |
| 11,132,959 B2 | 9/2021 | Lee |
| 11,502,608 B2 | 11/2022 | Aoki et al. |
| 11,605,356 B2 | 3/2023 | Lee et al. |
| 2010/0123741 A1 | 5/2010 | Shin et al. |
| 2011/0050743 A1* | 3/2011 | Park ............... G09G 3/3666 345/690 |
| 2011/0280002 A1* | 11/2011 | Furukawa ......... G02F 1/133603 362/231 |
| 2013/0099684 A1* | 4/2013 | Cheng ............... H05B 45/375 315/186 |
| 2020/0184905 A1 | 6/2020 | Park |
| 2021/0090488 A1* | 3/2021 | Jeong ............... G09G 3/32 |

FOREIGN PATENT DOCUMENTS

| | | |
|---|---|---|
| JP | 2019-120774 A | 7/2019 |
| JP | 2021-152619 A | 9/2021 |
| JP | 6968912 B2 | 11/2021 |
| KR | 10-1032037 B1 | 5/2011 |
| KR | 10-1350410 B1 | 1/2014 |
| KR | 10-2015-0036956 A | 4/2015 |
| KR | 10-2016-0074970 A | 6/2016 |
| KR | 10-1649565 B1 | 8/2016 |
| KR | 10-2017-0032579 A | 3/2017 |
| KR | 10-2017-0114813 A | 10/2017 |
| KR | 10-1877776 B1 | 7/2018 |
| KR | 10-2019-0085324 A | 7/2019 |
| KR | 10-2020-0041157 A | 4/2020 |
| KR | 10-2020-0042809 A | 4/2020 |
| KR | 10-2231363 B1 | 3/2021 |
| KR | 10-2245823 B1 | 4/2021 |
| KR | 10-2022-0107880 A | 8/2022 |

* cited by examiner

DISPLAY DEVICE AND LIGHT SOURCE DEVICE THEREOF

CROSS-REFERENCE TO RELATED APPLICATIONS

This application is a bypass continuation application of International Application No. PCT/KR2021/020152, filed on Dec. 29, 2021, which is based on and claims priority to Korean Patent Application No. 10-2021-0026499, filed on Feb. 26, 2021, in the Korean Intellectual Property Office, the disclosures of which are incorporated by reference herein in their entireties.

BACKGROUND

1. Field

The disclosure relates to a display device and a light source device, and more particularly, to a display device and a light source device that perform local dimming.

2. Description of Related Art

Display devices are a type of output devices for displaying obtained or stored electrical information for a user by converting the electrical information into visual information, and are used in various fields such as homes or workplaces.

Display devices include monitor devices connected to personal computers (PCs), server computers, or the like, portable computer devices, Global Positioning System (GPS) terminal devices, general television devices, Internet protocol televisions (IPTVs) devices, portable terminal devices such as smartphones, tablet PCs, personal digital assistants (PDAs), and cellular phones, various display devices used to reproduce images such as advertisements and movies in industrial sites, or other various types of audio/video systems.

The display device (e.g., a self-luminous display or a non-luminous display) includes a light source device for converting an electrical signal into a visual signal, and the light source device includes a plurality of light sources capable of separately emitting light. The light source includes, for example, a light-emitting diode (LED) or an organic LED (OLED).

In order to improve luminance of the display device, an increase in intensity of light emitted by each of the plurality of light sources is required, and an increase in value of a driving current supplied to each of the plurality of light sources is also required.

However, increasing the value of the driving current supplied to each of the plurality of light sources increases the temperature of the display device, and the light sources may be damaged due to the increase in temperature.

SUMMARY

Provided are a display device and a light source device thereof, capable of improving luminance of the display device while suppressing a temperature rise of the display device.

Also provided is a display device and a light source device thereof, capable of increasing a value of a current supplied to light sources of the display device while suppressing a temperature rise of the display device.

According to an aspect of the disclosure, a display device includes a liquid crystal panel; a plurality of light sources configured to emit light toward the liquid crystal panel, wherein the plurality of light sources are divided into a plurality of dimming blocks, each dimming block including one or more light sources; a driver configured to provide a current to each light source of the plurality of light sources; and a processor configured to: control the driver to provide the current to the one or more light sources included in each dimming block of the plurality of dimming blocks based on image data, obtain an average current value of currents provided to the one or more light sources included in each dimming block of the plurality of dimming blocks for a reference time based on the image data, and control the driver to provide a reduced current to the plurality of light sources based on at least one of a predetermined number of first dimming blocks or an arrangement of the first dimming blocks having the average current value being greater than or equal to a first reference current value.

The processor may be further configured to control the driver to provide the reduced current to the plurality of light sources based on the predetermined number of the first dimming blocks being greater than or equal to a reference number.

The processor may be further configured to control the driver to provide the reduced current to the plurality of light sources based on at least a reference number of the first dimming blocks being arranged adjacent to each other.

The reference number may correspond to approximately 10% of the plurality of dimming blocks.

The processor may be further configured to control the driver to provide an increased current to the plurality of light sources based on at least one of a predetermined number of second dimming blocks or an arrangement of the second dimming blocks having an average current value of the reduced currents being greater than or equal to a second reference current value.

The processor may be further configured to control the driver to provide the increased current to the plurality of light sources based on the predetermined number of the second dimming blocks being less than a reference number.

The processor may be further configured to control the driver to provide the increased current to the plurality of light sources based on at least a reference number of the second dimming blocks not being arranged adjacent to each other.

The processor may be further configured to reduce a maximum current value of currents provided to the plurality of light sources based on at least one of the predetermined number of the first dimming blocks or the arrangement of the first dimming blocks.

The processor may be further configured to increase the reduced maximum current value of the currents provided to the plurality of light sources based on at least one of a predetermined number of second dimming blocks or the arrangement of the second dimming blocks having an average current value of the reduced currents being greater than or equal to a second reference current value.

The first reference current value may correspond to the maximum current value, and the second reference current value may correspond to the reduced maximum current value.

A ratio of the first reference current value and the maximum current value is approximately equal to a ratio of the second reference current value and the reduced maximum current value.

The display device may further include a memory configured to store a matrix composed of current values of currents provided to the one or more light sources included in each dimming block of the plurality of dimming blocks.

The processor may be further configured to obtain an average of the current values stored in the matrix using an averaging filter.

According to an aspect of the disclosure, a method of controlling a display device includes providing a current to one or more light sources included in each of a plurality of dimming blocks to emit light toward a liquid crystal panel; obtaining an average current value of currents provided to the one or more light sources included in each dimming block of the plurality of dimming blocks for a reference time based on image data; and providing a reduced current to the plurality of light sources based on at least one of a predetermined number of first dimming blocks or an arrangement of the first dimming blocks having the average current value being greater than or equal to a first reference current value.

The providing of the reduced current to the plurality of light sources may include providing the reduced current to the plurality of light sources based on the predetermined number of the first dimming blocks being greater than or equal to a reference number.

According to an aspect of the disclosure, a display device and a light source device thereof are provided which can improve luminance of the display device while suppressing a temperature rise of the display device.

According to another aspect of the disclosure, a display device and a light source device thereof are provided which can increase a value of a current supplied to light sources of the display device while suppressing a temperature rise of the display device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
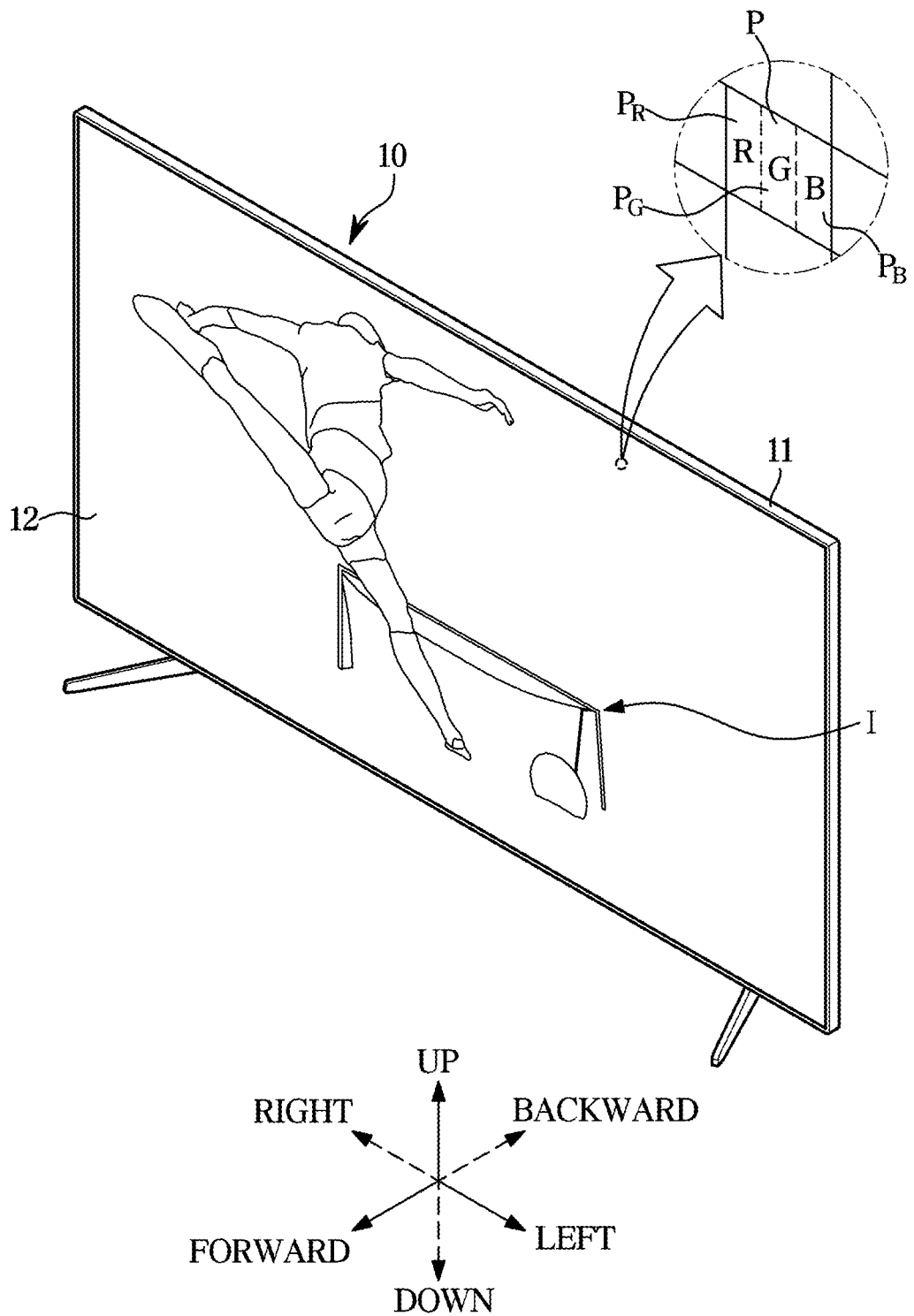
FIG. 1 illustrates an example of an appearance of a display device, according to an embodiment.

Throughout the specification, like reference numerals refer to like components. This specification does not describe all components of embodiments, and common descriptions in the technical field to which the present invention pertains and redundant descriptions between embodiments will be omitted. Terms "part," "module," "member," and "block" used in this specification may be implemented in software or hardware, and according to embodiments, a plurality of "parts," "modules," "members," and "blocks" can be implemented in a single component or a single "part," "module," "member," or "block" can include a plurality of components.

Throughout this specification, when a part is referred to as being "connected" to other parts, it includes not only a direct connection but also an indirect connection, and the indirect connection includes a connection through a wireless communication network.

In addition, when describing that a part "includes" or "comprises" a certain component, unless there is a particular description contrary thereto, the part may further include additional components, not excluding the other components.

Throughout this specification, when describing that a certain member is located "on" another member, this includes not only a case in which the certain member is in contact with another member but also a case in which a different another member is present between the two members.

Terms "first," "second," and the like are used to distinguish one component from other components, and components are not limited by these terms.

The singular forms include plural forms unless the context clearly notes otherwise.

In each of operations, a reference numeral is used for convenience of description, and this reference numeral does not describe the order of the operations, and the operations may be differently performed from the described order unless clearly specified in the context.

Hereinafter, an operation principle and embodiments of the present disclosure will be described with reference to the accompanying drawings.

FIG. 1 illustrates an example of an appearance of a display device according to an embodiment.

A display device 10 is a device that is able to process image signals received from the outside and visually display the processed images. In the following description, it is assumed that the display device 10 is a television (TV), but the present disclosure is not limited thereto. For example, the display device 10 may be implemented in various forms, such as a monitor, a portable multimedia device, and a portable communication device, and the display device 10 is not limited in its shape as long as the display device 10 visually displays an image.

In addition, the display device 10 maybe a large format display (LFD) installed outdoor places such as on a rooftop of a building or at a bus stop. Here, the outdoor places are not necessarily limited to the outdoors, and the display device 10 may be installed at any place, even indoors with a lot of foot traffic, e.g., at subway stations, shopping malls, theaters, offices, stores, and the like.

The display device 10 may receive content including video and audio signals from various content sources and output video and audio corresponding to the video and audio signals. For example, the display device 10 may receive content data through a broadcast receiving antenna or a wired cable, receive content data from a content reproducing device, or receive content data from a content providing server of a content provider.

As shown in FIG. 1, the display device 10 may include a main body 11 and a screen 12 that displays an image I.

The main body 11 forms an exterior of the display device 10, and components for the display device 10 to display the image I or perform various functions may be provided in the main body 11. Although the main body 11 illustrated in FIG. 1 has a flat plate shape, the shape of the main body 11 is not limited thereto. For example, the main body 11 may have a curved plate shape.

The screen 12 may be formed on a front surface of the main body 11 and may display the image I. For example, the screen 12 may display still images or moving images. In addition, the screen 12 may also display two dimensional (2D) plane images, or three dimensional (3D) stereographic images using parallax of both eyes of a user.

The screen 12 may include, for example, a self-luminous panel (e.g., a light-emitting diode (LED) panel or an organic LED (OLED) panel) capable of directly emitting light, or a non-luminous panel (e.g., a liquid crystal panel) capable of passing or blocking light emitted by, for example, a light source device (e.g., a backlight unit).

A plurality of pixels P are formed on the screen 12, and the image I displayed on the screen 12 may be formed by light emitted by each of the plurality of pixels P. For example, the image I may be formed on the screen 12 by combining the light emitted by each of the plurality of pixels P like a mosaic.

Each of the plurality of pixels P may emit light in various colors and brightnesses. Each of the plurality of pixels P may include sub-pixels $P_R$, $P_G$, and $P_B$ to emit various colors of light.

The sub-pixels $P_R$, $P_G$, and $P_B$ may include a red sub-pixel $P_R$ capable of emitting red light, a green sub-pixel $P_G$ capable of emitting green light, and a blue sub-pixel $P_B$ capable of emitting blue light. For example, the red light may represent light having a wavelength in the range of about 620 nm (nanometers, one billionth of a meter) to 750 nm. The green light may represent light having a wavelength in the range of about 495 nm to 570 nm. The blue light may represent light having a wavelength in the range of about 450 nm to 495 nm.

By combining the red light of the red sub-pixel $P_R$, the green light of the green sub-pixel $P_G$, and the blue light of the blue sub-pixel $P_B$, each of the plurality of pixels P may emit various brightness and colors of light.

Figure 2:
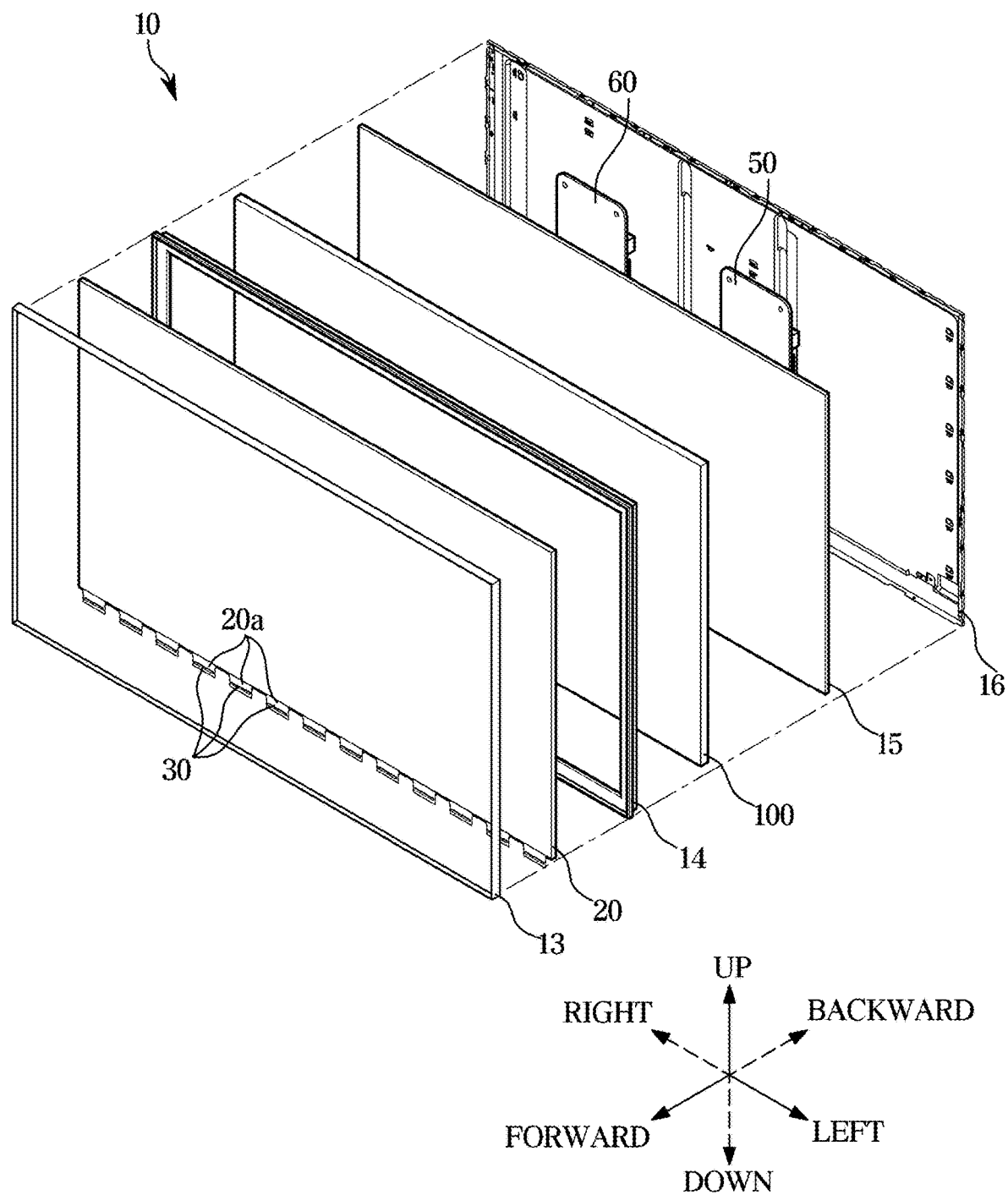
FIG. 2 illustrates an example of a structure of the display device, according to an embodiment.
Figure 3:
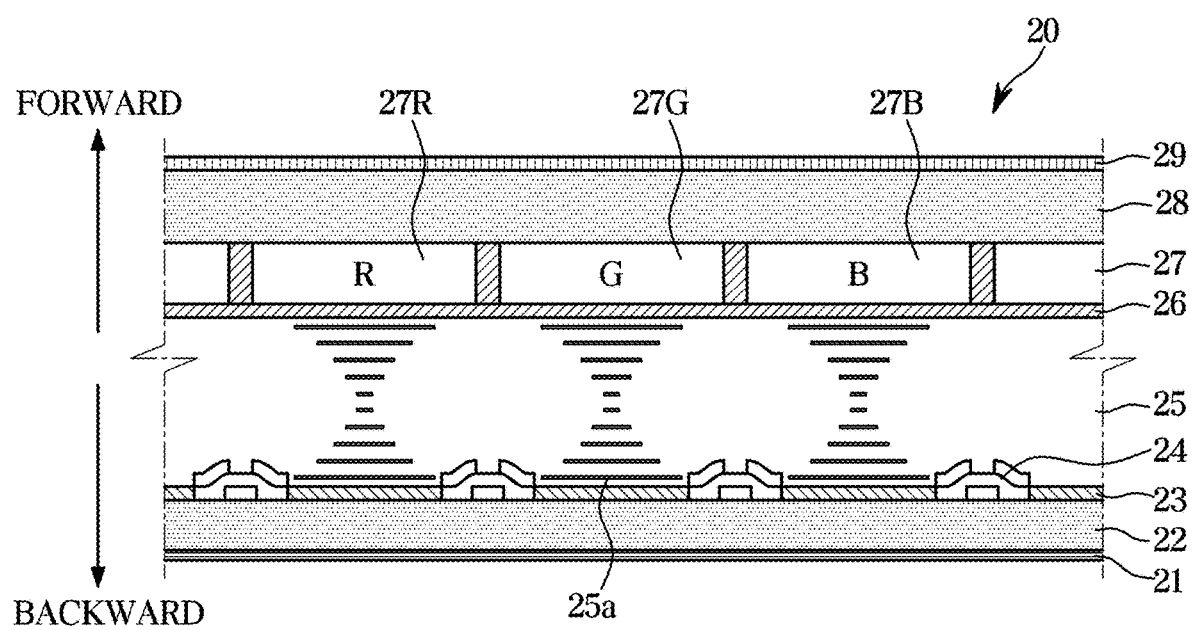
FIG. 3 illustrates an example of a liquid crystal panel included in the display device, according to an embodiment.

FIG. 2 illustrates an example of a structure of the display device according to an embodiment. FIG. 3 illustrates an example of a liquid crystal panel included in the display device according to an embodiment.

As shown in FIG. 2, various components for generating the image I on a screen S may be provided inside the main body 11.

For example, a light source device 100, which is a surface light source, a liquid crystal panel 20 configured to block or pass light emitted from the light source device 100, a control assembly 50 configured to control operations of the light source device 100 and the liquid crystal panel 20, and a power assembly 60 configured to supply power to the light source device 100 and the liquid crystal panel 20 are provided in the main body 11. In addition, the main body 11 may include a bezel 13, a frame middle mold 14, a bottom chassis 15, and a rear cover 16 which are configured to support the liquid crystal panel 20, the light source device 100, the control assembly 50, and the power assembly 60.

The light source device 100 may include a point light source configured to emit monochromatic light or white light. In addition, the light source device 100 may refract, reflect, and scatter light emitted from the point light source to convert the light to uniform surface light. As such, the light source device 100 may emit the uniform surface light in a forward direction by refracting, reflecting and scattering the light emitted from the point light source.

The light source device 100 will be described in more detail below.

The liquid crystal panel 20 is provided in front of the light source device 100, and blocks or passes the light emitted from the light source device 100 to form the image I.

A front surface of the liquid crystal panel 20 may form the screen S of the display device 10 described above, and the liquid crystal panel 20 may include the plurality of pixels P. Each of the plurality of pixels P of the liquid crystal panel 20 may independently block or pass the light from the light source device 100. In addition, the light that has passed by the plurality of pixels P may form the image I displayed on the screen S.

For example, as shown in FIG. 3, the liquid crystal panel 20 may include a first polarizing film 21, a first transparent substrate 22, a pixel electrode 23, a thin-film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin-film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 are provided on outer sides of the first and second transparent substrates 22 and 28. The first and second polarizing films 21 and 29 may each pass particular polarized light, and block (reflect or absorb) other polarized light. For example, the first polarizing film 21 may pass polarized light of a first direction and block (reflect or absorb) other polarized light. In addition, the second polarizing film 29 may pass polarized light of a second direction and block (reflect or absorb) other polarized light. Here, the first and second directions may be perpendicular to each other. As a result, the polarized light that has passed the first polarizing film 21 may not pass the second polarizing film 29.

The color filter 27 may be provided on an inner side of the second transparent substrate 28. The color filter 27 may include, for example, a red filter 27R that passes red light, a green filter 27G that passes green light, and a blue filter 27 Bthat passes blue light. In addition, the red, green, and blue filters 27R, 27G, and 27B may be arranged side by side. An area occupied by the color filter 27 corresponds to the pixel P described above. An area occupied by the red filter 27R corresponds to the red sub-pixel $P_R$, an area occupied by the green filter 27G corresponds to the green sub-pixel $P_G$, and an area occupied by the blue filter 27B corresponds to the blue sub-pixel $P_B$.

The pixel electrode 23 may be provided on an inner side of the first transparent substrate 22, and the common electrode 26 may be provided on the inner side of the second transparent substrate 28. The pixel electrode 23 and the common electrode 26 are formed of an electrically conductive metal material, and may produce an electric field to change arrangement of liquid crystal molecules 115a that form the liquid crystal layer 25, which will be described below.

The thin-film transistor (TFT) 24 is provided on an inner side of the first transparent substrate 22. The TFT 24 may pass or block a current flowing through the pixel electrode 23. For example, depending on whether the TFT 24 is turned on (closed) or turned off (opened), an electric field may be formed or removed from between the pixel electrode 23 and the common electrode 26.

The liquid crystal layer 25 may be formed between the pixel electrode 23 and the common electrode 26 and filled with liquid crystal molecules 25a. The liquid crystals may be in an intermediate state between a solid (crystal) and a liquid. The liquid crystal may exhibit an optical property according to a change in electric field. For example, in the liquid crystal, directions of arrangement of molecules that form the liquid crystal may be changed according to a change in electric field. As a result, the optical property of the liquid crystal layer 25 may be changed according to whether there is an electric field passing the liquid crystal layer 25.

A cable 20a configured to transmit image data to the liquid crystal panel 20 and a display driver integrated circuit (DDI) 30 (hereinafter, referred to as a "panel driver") configured to process digital image data to output an analog image signal are provided on one side of the liquid crystal panel 20.

The cable 20a may electrically connect between the control assembly 50/the power assembly 60 and the panel driver 30, and may also electrically connect between the panel driver 30 and the liquid crystal panel 20. The cable 20a may include a flexible flat cable or a film cable that is bendable.

The panel driver 30 may receive image data and power from the control assembly 50/power assembly 60 through the cable 20a. In addition, the panel driver 30 may provide image data and a driving current to the liquid crystal panel 20 through the cable 20a.

In addition, the cable 20a and the panel driver 30 may be integrally implemented as a film cable, a chip on film (COF), a table carrier package (TCP), or the like. In other words, the panel driver 30 may be disposed on the cable 20a. However, the panel driver 30 is not limited thereto, and may be disposed on the liquid crystal panel 20.

The control assembly 50 may include a control circuit configured to control operations of the liquid crystal panel 20 and the light source device 100. For example, the control circuit may process a video signal and/or an audio signal received from an external content source. The control circuit may transmit image data to the liquid crystal panel 20, and transmit dimming data to the light source device 100.

The power assembly 60 may include a power circuit configured to supply power to the liquid crystal panel 20 and the light source device 100. The power circuit may supply power to the light source device 100 so that the light source device 100 outputs surface light. The power circuit may supply power to the liquid crystal panel 20 so that the liquid crystal panel 20 blocks or passes the light of the light source device 100.

The control assembly 50 and the power assembly 60 may be implemented with a printed circuit board and various circuits mounted on the printed circuit board. For example, the power circuit may include a power circuit board, and a capacitor, a coil, a resistor element, a processor, and the like that are mounted on the power circuit board. In addition, the control circuit may include a control circuit board, and a memory and a processor mounted on the control circuit board.

Figure 4:
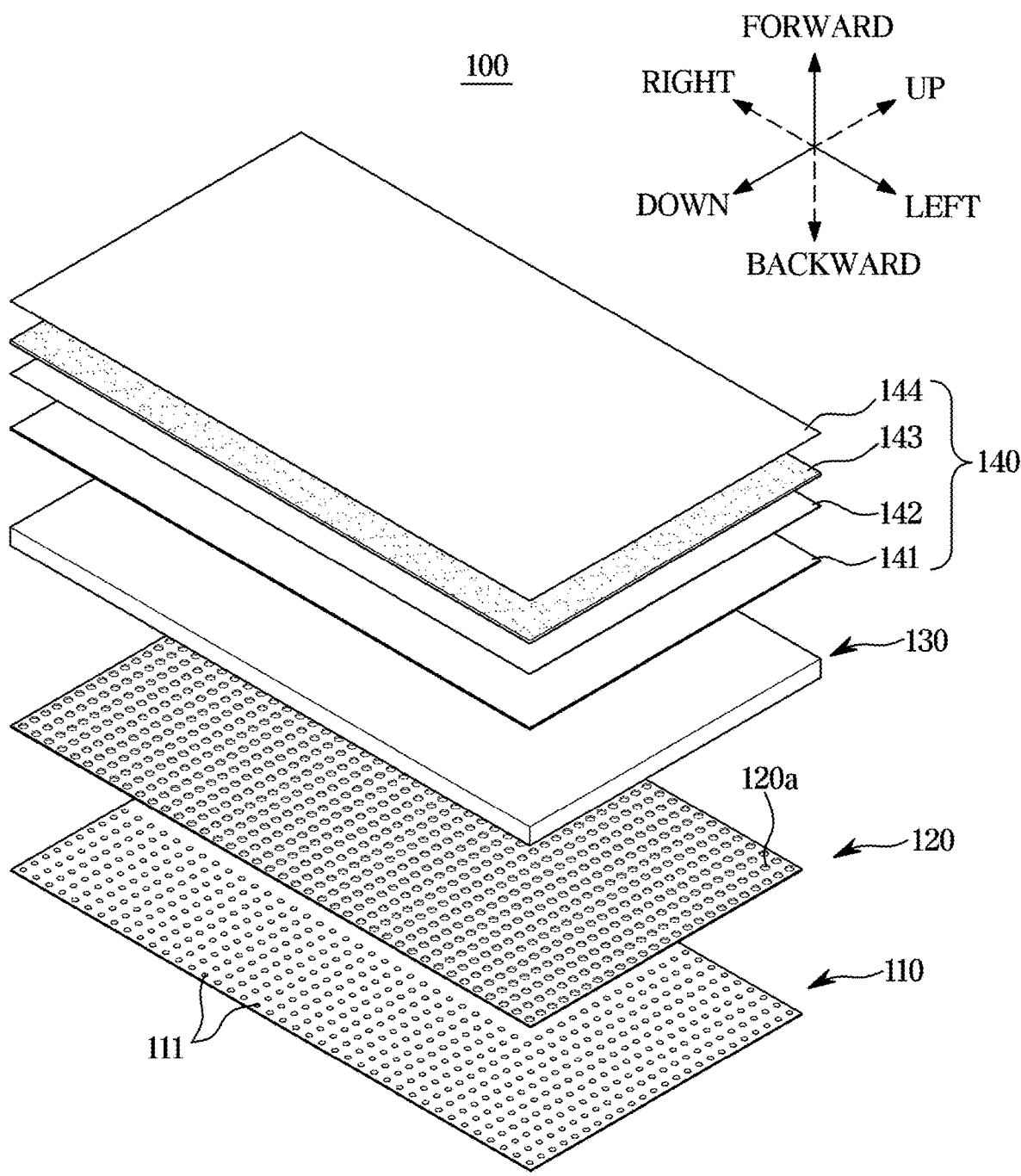
FIG. 4 illustrates an example of a light source device included in the display device according to an embodiment.
Figure 5:
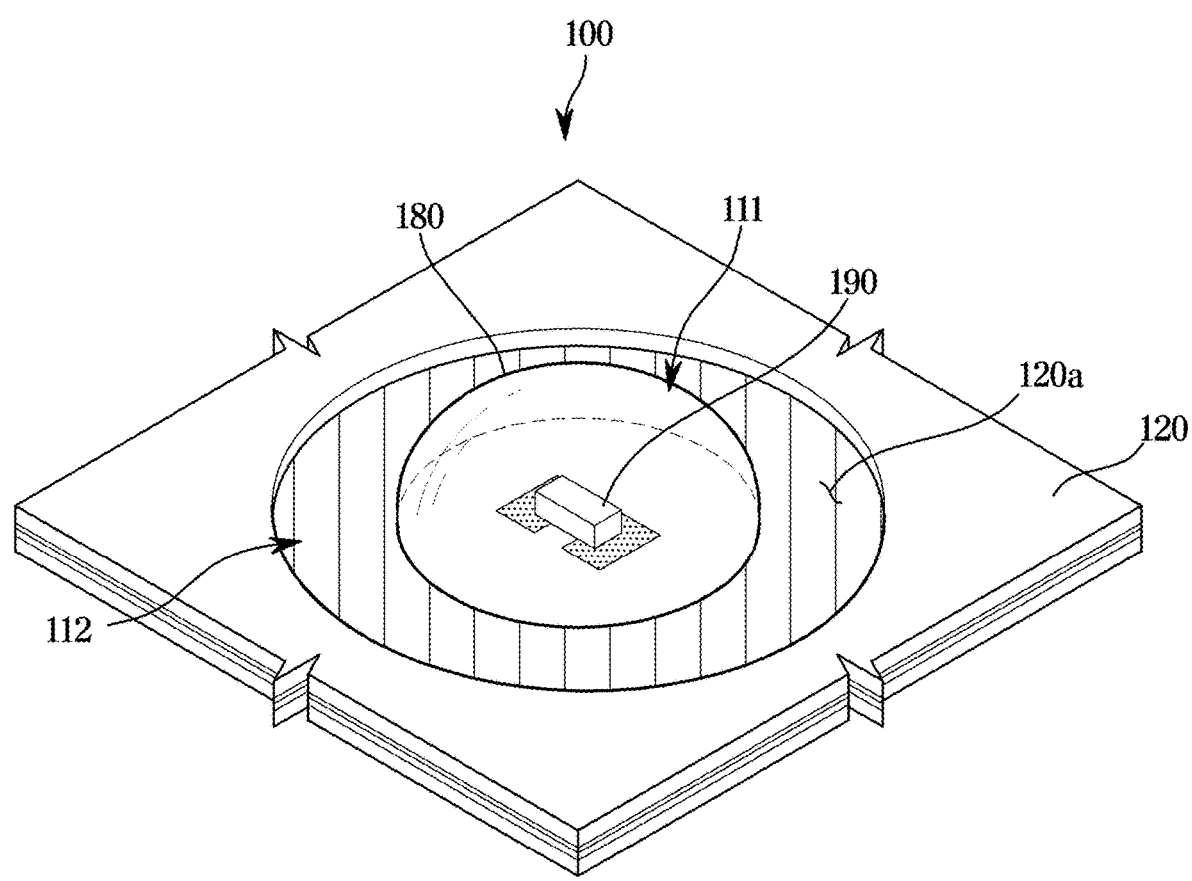
FIG. 5 illustrates an example of a light source included in the light source device, according to an embodiment.

FIG. 4 illustrates an example of the light source device included in the display device according to an embodiment. FIG. 5 illustrates an example of the light source included in the light source device according to an embodiment.

As shown in FIG. 4, the light source device 100 may include a light source module 110 configured to generate light, a reflection sheet 120 configured to reflect light, a diffuser plate 130 configured to uniformly diffuse light, and an optical sheet 140 that enhances luminance of emitted light.

The light source module 110 may include a plurality of light sources 111 that emit light, and a substrate 112 that supports/fixes the plurality of light sources 111.

The plurality of light sources 111 may be arranged in a predefined pattern to allow light to be emitted with uniform luminance. The plurality of light sources 111 may be arranged in such a way that a distance between one light source and light sources adjacent thereto is the same.

For example, as shown in FIG. 4, the plurality of light sources 111 may be arranged in rows and columns. Accordingly, the plurality of light sources may be arranged such that an approximately square is formed by four adjacent light sources. In addition, any one light source may be disposed adjacent to four light sources, and a distance between one light source and four light sources adjacent thereto may be approximately the same.

The plurality of light sources may be arranged such that an approximately equilateral triangle is formed by three adjacent light sources. In this case, one light source may be disposed adjacent to six light sources. In addition, a distance between one light source and six light sources adjacent thereto maybe approximately the same.

However, the arrangement of the plurality of light sources 111 is not limited thereto, and the plurality of light sources 111 may be arranged in various ways to allow light to be emitted with uniform luminance.

The light source 111 may employ an element configured to emit monochromatic light (light with a specific range of wavelengths or light with a single peak wavelength, for example, blue light) or white light (light with a plurality of peak wavelengths, for example, a light of a mixture of red light, green light, and blue light) in various directions, when power is supplied thereto.

Each of the plurality of light sources 111 may include a light-emitting diode (LED) 190 and an optical dome 180.

A thickness of the light source device 100 may also be reduced so that a thickness of the display device 10 is also reduced. To reduce the thickness of the light source device 100, each of the plurality of light sources 111 thinner and the structure becomes simpler.

The LED 190 may be attached directly to the substrate 112 in a method of chip on board (COB). For example, the light source 111 may include the LED 190 in which an LED chip or an LED die is attached directly to the substrate 112 without extra packaging.

The LED 190 may be manufactured in a flip chip type. The LED 190 of the flip chip type may not use an intermediate medium such as a metal lead (wire) or a ball grid array (BGA) to attach the LED, which is a semiconductor device, to the substrate 112, but may fuse an electrode pattern of the semiconductor device onto the substrate 112 as it is. In this way, miniaturization of the light source 111 including the LED 190 of the flip chip type is possible since the metal lead (wire) or ball grid array is omitted.

Although the LED 190 is described above as having a flip chip type directly fused onto the substrate 112 by the COB method, the light source 111 is not limited to the flip chip type LED. For example, the light source 111 may include a package type LED.

The optical dome 180 may cover the LED 190. The optical dome 180 may prevent or suppress damage to the LED 190 due to an external mechanical action and/or damage to the LED 190 due to a chemical action.

The optical dome 180 may have a shape of, for example, a dome obtained by cutting a sphere with a plane not including its center or a semi-sphere obtained by cutting a sphere with a plane including its center. A vertical cross-section of the optical dome 180 may have, for example, an arcuate shape or a semi-circular shape.

The optical dome 180 may be formed of silicone or epoxy resin. For example, melted silicone or epoxy resin is discharged onto the LED 190 through a nozzle or the like, and then hardened to form the optical dome 180.

Accordingly, the shape of the optical dome 180 may be variously changed according to the viscosity of the liquid silicone or epoxy resin. For example, when the optical dome 180 is manufactured using silicone having a thixotropic index of approximately 2.7 to 3.3 (preferably 3.0), an optical dome 180 having a dome ratio of approximately 0.25 to 0.31 (preferably 0.28) that represents a ratio of a height of the dome (a diameter of the dome/a diameter of a lower surface of the dome) to a diameter of the lower surface may be formed.

The optical dome 180 may be optically transparent or translucent. Light emitted from the LED 190 may pass through the optical dome 180 and may be emitted to the outside.

In this case, the dome-shaped optical dome 180 may refract the light like a lens. For example, the light emitted from the LED 190 may be refracted and dispersed by the optical dome 180.

As such, the optical dome 180 may not only protect the LED 190 from an external mechanical action and/or chemical action or electrical action, but also disperse the light emitted from the LED 190.

In the above, although the optical dome 180 is described as have a dome shape, the light source 111 is not limited to including the optical dome 180. For example, the light sources 111 may include a lens for dispersing the light emitted from the LED.

The substrate 112 may fix the plurality of light sources 111 to prevent the light sources 111 from being changed in positions. In addition, the substrate 112 may supply power to each of the light sources 111 so that the light source 111 may emit light.

The substrate 112 may fix the plurality of light sources 111. The substrate 112 may be formed of a synthetic resin, tampered glass, or a printed circuit board (PCB) in which conductive power supply lines for supplying power to the light sources 111 are formed.

The reflection sheet 120 may reflect light emitted from the plurality of light sources 111 to a forward direction or to a nearly forward direction.

A plurality of through holes 120a are formed on the reflection sheet 120 at positions respectively corresponding to the plurality of light sources 111 of the light source module 110. In addition, the light sources 111 of the light source module 110 may pass through the through holes 120a and protrude forward from the reflection sheet 120. Accordingly, the plurality of light sources 111 may emit light from the front of the reflection sheet 120. The reflection sheet 120 may reflect the light emitted toward the reflection sheet 120 from the plurality of light sources 111 toward the diffuser plate 130.

The diffuser plate 130 may be provided in front of the light source module 110 and the reflection sheet 120. The diffuser plate 130 is able to uniformly diffuse the light emitted from the light sources 111 of the light source module 110.

As described above, the plurality of light sources 111 are equidistantly arranged on a rear surface of the light source device 100. This may cause non-uniformity in luminance depending on the positions of the plurality of light sources 111.

In order to eliminate the non-uniformity in luminance due to the plurality of light sources 111, the diffuser plate 130 may diffuse the light emitted from the plurality of light sources 111 within the diffuser plate 130. In other words, the diffuser plate 130 may uniformly emit non-uniform light from the plurality of light sources 111 forward.

The optical sheet 140 may include various sheets to improve luminance and uniformity in luminance. For example, the optical sheet 140 may include a light conversion sheet 141, a diffuser sheet 142, a prism sheet 143, and a reflective polarizing sheet 144, and the like.

The optical sheet 140 is not limited to the sheets or films illustrated in FIG. 4, and may further include other various sheets or films such as protective sheets.

Figure 6:
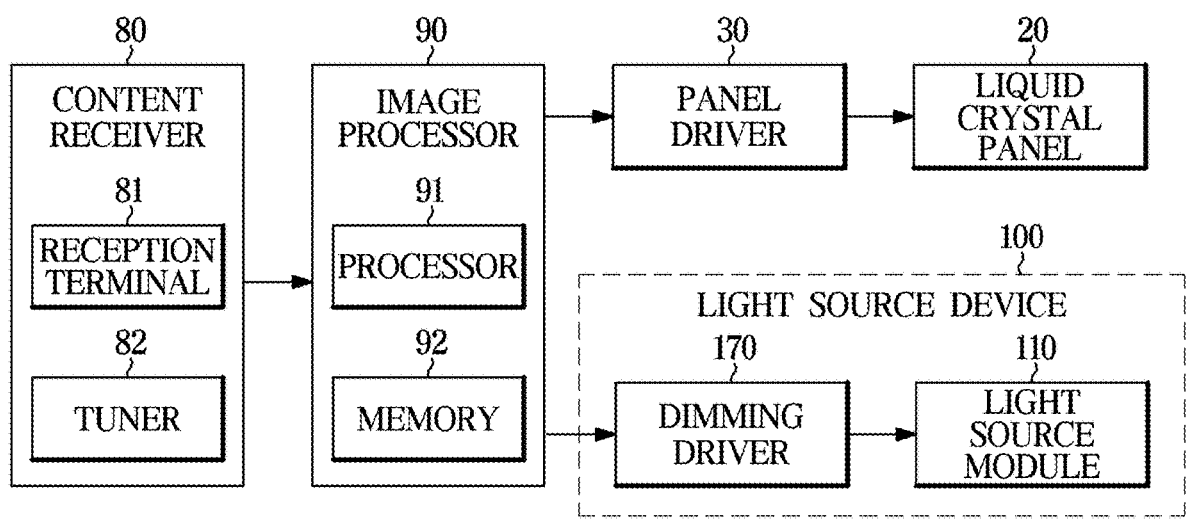
FIG. 6 illustrates an example of a configuration of the display device, according to an embodiment.
Figure 7:
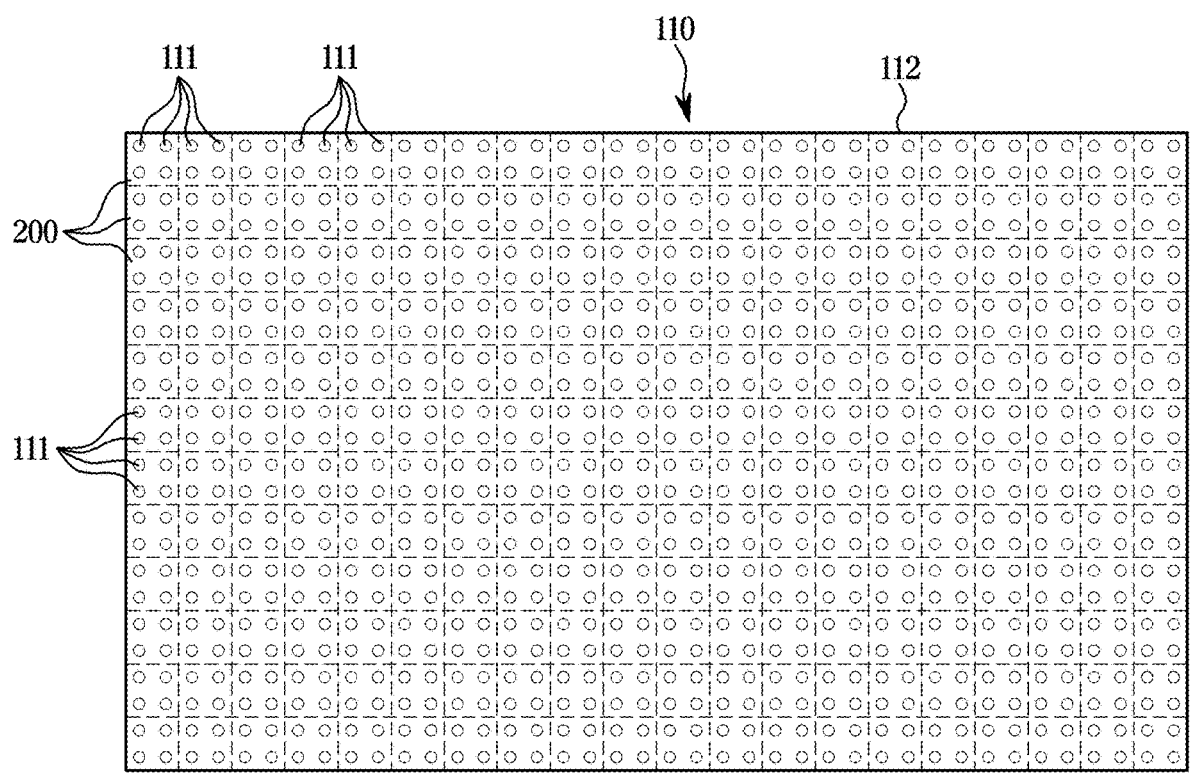
FIG. 7 illustrates an example of dimming blocks of the light source device included in the display device, according to an embodiment.
Figure 8:
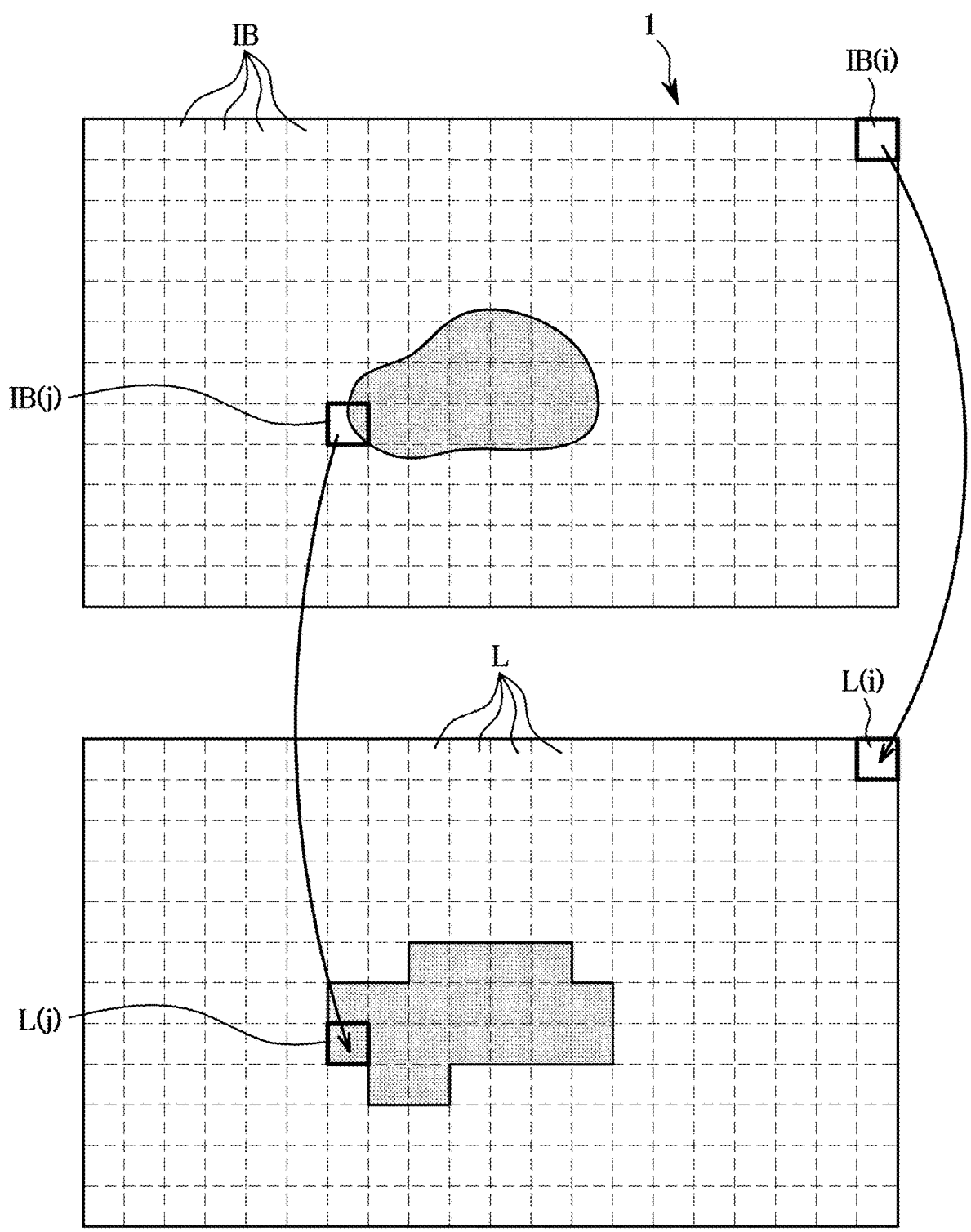
FIG. 8 illustrates an example in which the display device according to an embodiment converts image data into dimming data.

FIG. 6 illustrates an example of a configuration of the display device according to an embodiment. FIG. 7 illustrates an example of dimming blocks of the light source device included in the display device according to an embodiment. FIG. 8 illustrates an example in which the display device according to an embodiment converts image data into dimming data.

As shown in FIG. 6, the display device 10 may include a content receiver 80, an image processor 90, the panel driver 30, the liquid crystal panel 20, and the light source device 100. In addition, the light source device 100 may include a dimming driver 170 and the light source module 110.

The content receiver 80 may include a reception terminal 81 and a tuner 82 for receiving contents including video signals and/or audio signals from content sources.

The reception terminal 81 may receive video signals and audio signals from the content sources via a cable. For example, the reception terminal 81 may include a component (YPbPr/RGB) terminal, a composite video blanking and sync (CVBS) terminal, an audio terminal, a high definition multimedia interface (HDMI) terminal, a universal serial bus (USB) terminal, and the like.

The tuner 82 may receive broadcast signals through a broadcast receiving antenna or a wired cable. In addition, the tuner 82 may extract a broadcast signal on a channel selected by a user from the broadcast signals. For example, the tuner 82 may pass a broadcast signal having a frequency corresponding to the channel selected by the user among a plurality of broadcast signals received through the broadcast receiving antenna or the wired cable, and block the other broadcast signals having different frequencies.

As such, the content receiver 80 may receive video signals and audio signals from the content sources via the reception terminal 81 and/or the tuner 82. The content receiver 80 may output the video signals and/or the audio signals received via the reception terminal 81 and/or the tuner 82 to the image processor 90.

The image processor 90 may include a processor 91 configured to process image data, and a memory 92 configured to memorize/store a program and data for processing the image data.

The memory 92 may store a program and data for processing video signals and/or audio signals. In addition, the memory 92 may temporarily memorize data generated in processing the video signal and/or the audio signal.

The memory 92 may include a non-volatile memory, such as a read only memory (ROM) and a flash memory, and a volatile memory, such as a static random access memory (S-RAM) and a dynamic RAM (D-RAM).

The processor 91 may receive video signals and/or audio signals from the content receiver 80. The processor 91 may decode the video signal into image data. The processor 91 may generate dimming data from the image data. In addition, the processor 91 may output the image data and the dimming data to the panel driver 30 and the dimming driver 170, respectively.

As such, the image processor 90 may generate image data and dimming data from the video signals obtained by the content receiver 80. In addition, the image processor 90 may transmit the image data and the dimming data to the liquid crystal panel 20 and the light source device 100, respectively.

The image data may include information about intensity of light passed by each of the plurality of pixels (or the plurality of sub-pixels) included in the liquid crystal panel 20. The image data may be provided to the liquid crystal panel 20 via the panel driver 30.

The liquid crystal panel 20 includes a plurality of pixels capable of passing or blocking light, and the plurality of pixels are arranged in a matrix form. In other words, the plurality of pixels may be arranged in a plurality of rows and a plurality of columns.

The panel driver 30 may receive image data from the image processor 90. The panel driver 30 may drive the liquid crystal panel 20 according to the image data. In other words, the panel driver 30 may convert the image data, which is a digital signal, (hereinafter, referred to as "digital image data") to an analog image signal, which is an analog voltage signal. The panel driver 30 may provide the converted analog image signal to the liquid crystal panel 20. According to the analog image signal, an optical property (e.g., light transmittance) of the plurality of pixels included in the liquid crystal panel 20 may be changed.

The panel driver 30 may include, for example, a timing controller, a data driver, a scan driver, and the like.

The timing controller may receive image data from the image processor 90. The timing controller may output the image data and a driving control signal to the data driver and the scan driver. The driving control signal may include a scan control signal and a data control signal. The scan control signal and the data control signal may be used to control an operation of the scan driver and an operation of the data driver, respectively.

The scan driver may receive the scan control signal from the timing controller. The scan driver may input-activate one of the plurality of rows in the liquid crystal panel 20 according to the scan control signal. In other words, the scan driver may convert pixels included in any one row among the plurality of pixels arranged in the plurality of rows and the plurality of columns into a state of being able to receive analog image signals. In this case, the other pixels other than the pixels input-deactivated by the scan driver may not receive the analog image signals.

The data driver may receive image data and the data control signal from the timing controller. The data driver may output the image data to the liquid crystal panel 20 according to the data control signal. For example, the data driver may receive digital image data from the timing controller. The data driver may convert the digital image data into an analog image signal. In addition, the data driver may provide the analog image signal to pixels included in any one row input-activated by the scan driver. In this case, the pixels input-activated by the scan driver may receive the analog image signal. An optical property (e.g., light transmittance) of the input-activated pixels is changed according to the received analog image signal.

As such, the panel driver 30 may drive the liquid crystal panel 20 according to the image data. Accordingly, an image corresponding to the image data may be displayed on the liquid crystal panel 20.

In addition, the dimming data may include information about intensity of light emitted by each of the plurality of light sources (or a plurality of dimming blocks) included in the light source device 100. The dimming data may be provided to the light source device 100 via the dimming driver 170.

The light source device 100 may include the plurality of light sources 111 that emit light. The plurality of light sources 111 are arranged in a matrix form. In other words, the plurality of light sources 111 may be arranged in a plurality of rows and a plurality of columns.

In addition, the light source device 100 may be partitioned into a plurality of dimming blocks 200. In addition, each of the plurality of dimming blocks 200 may include at least one light source.

The light source device 100 may output surface light by diffusing light emitted from the plurality of light sources 111. The liquid crystal panel 20 may include the plurality of pixels, and control the plurality of pixels so that each thereof passes or blocks light. An image may be formed by light passing through each of the plurality of pixels.

In this case, the light source device 100 may turn off the plurality of light sources corresponding to dark portions of the image to further darken the dark portions of the image. Accordingly, a contrast ratio of the image may be improved as the dark portions of the image become darker.

As such, the operation of controlling the plurality of light sources so that the light source device 100 does not emit light from portions corresponding to the dark portions of the image is referred to below as "local dimming."

For local dimming, the plurality of light sources 111 included in the light source device 100 may be divided into the plurality of dimming blocks 200 as shown in FIG. 7. In FIG. 7, a total of 240 dimming blocks, 20 horizontally×12 vertically, are shown, but the number and arrangement of the dimming blocks are not limited to those shown in FIG. 7.

Each of the plurality of dimming blocks 200 may include at least one light source 111. The light source device 100 may supply the same driving current to the light sources belonging to the same dimming block, and the light sources belonging to the same dimming block may emit light with the same brightness. In addition, the light source device 100 may supply different driving currents to the light sources belonging to different dimming blocks according to dimming data, and the light sources belonging to the different dimming blocks may emit light with different brightness.

Although the dimming blocks each including four light sources are illustrated in FIG. 7, the number and arrangement of the light sources included in each of the dimming blocks is not limited to those shown in FIG. 7.

As described above, the image processor 90 may provide dimming data for local dimming to the light source device 100. The dimming data may include information about luminance of each of the plurality of dimming blocks 200. For example, the dimming data may include information about intensity of light output from the light sources included in each of the plurality of dimming blocks 200.

The image processor 90 may obtain the dimming data from the image data.

The image processor 90 may convert the image data into the dimming data in various methods. For example, as illustrated in FIG. 8, the image processor 90 may partition the image I from the image data into a plurality of image blocks IB. The number of the plurality of image blocks IB is the same as the number of the plurality of dimming blocks 200, and the plurality of image blocks IB may correspond to the plurality of dimming blocks 200, respectively.

The image processor 90 may obtain luminance values L of the plurality of dimming blocks 200 from the image data of the plurality of image blocks IB. In addition, the image processor 90 may generate dimming data by combining the luminance values L of the plurality of dimming blocks 200.

For example, the image processor 90 may obtain the luminance value L of each of the plurality of dimming blocks 200 based on a maximum value of luminance values of pixels included in each of the image blocks IB.

One image block may include a plurality of pixels, and image data of one image block may include image data of the plurality of pixels (e.g., red data, green data, blue data, and the like). The image processor 90 may calculate a luminance value of each of the pixels based on image data of each of the pixels.

The image processor 90 may determine a maximum value of the luminance value of each of the pixels included in the image block as a luminance value of a dimming block corresponding to the image block. For example, the image processor 90 may determine a maximum value of luminance values of pixels included in an i-th image block IB(i) as a luminance value L(i) of an i-th dimming block, and determine a maximum value of luminance values of pixels included in a j-th image block IB(j) as a luminance value L(j) of a j-th dimming block.

The image processor 90 may generate dimming data by combining the luminance values of the plurality of dimming blocks 200.

The dimming driver 170 may receive dimming data from the image processor 90. The dimming driver 170 may drive the light source module 110 according to the dimming data. Here, the dimming data may include information about luminance of each of the plurality of dimming blocks 200, or information about brightness of the light sources included in each of the plurality of dimming blocks 200.

The dimming driver 170 may convert the dimming data, which is a digital voltage signal, into an analog driving current. The dimming driver 170 may provide the analog driving current to the light source module 110. The light sources 111 included in the light source module 110 may emit light by the analog driving current.

In particular, the dimming driver 170 may supply a driving current having the same magnitude to the light sources belonging to the same dimming block according to the dimming data. In addition, the dimming driver 170 may supply driving currents having different magnitudes to the light sources belonging to different dimming blocks according to the dimming data.

Depending on the dimming data, the light sources belonging to the same dimming block may emit light of the same intensity. In addition, depending on the dimming data, the light sources belonging to different dimming blocks may emit light of different intensities.

As described above, the light source device 100 includes the plurality of dimming blocks 200, and each of the plurality of dimming blocks 200 may include the plurality of light sources 111. In addition, the light sources belonging to each of the dimming blocks may emit light of the same intensity, and a driving current having the same magnitude may be supplied to the light sources belonging to each of the dimming blocks. In addition, the light sources belonging to each of the dimming blocks maybe disposed at positions adjacent to each other.

In order for one dimming block to emit light with maximum luminance, a maximum driving current may be supplied to the light sources included in the one dimming block, and the light sources included in the one dimming block may emit light of maximum intensity.

The light sources included in the dimming block that emit light with maximum luminance may emit light of maximum intensity as well as emit heat of maximum intensity. That is, the LED included in the light source emits not only light but also heat, and may emit heat of maximum intensity while emitting light of maximum intensity.

Since the light sources arranged at positions adjacent to each other emit heat of maximum intensity, the light source device 100 may be locally overheated. In other words, the light sources included in the dimming block that emit light of maximum luminance may be overheated. Due to the partial overheating of the light source device 100, the light sources 111 maybe damaged, or circuits of the substrate 112 maybe damaged.

The overheating of the light source device 100 may depend on an absolute brightness of image data. For example, when the entire image includes a white color of maximum brightness, all the dimming blocks included in the light source device 100 may emit light of maximum luminance. In addition, the light sources included in the dimming block emit light of maximum intensity and heat, which may cause the light source device 100 to be overheated.

The partial overheating of the light source device 100 may be dependent on an absolute brightness of image data as well as the density of bright portions of an image.

When bright portions in an image are concentrated in a portion of the image, the light sources included in the dimming blocks adjacent to each other may emit light of maximum luminance. Accordingly, heating may be concentrated in a portion of the light source device 100, and the light source device 100 may be locally overheated.

On the other hand, when the bright portions of the image are sporadically distributed throughout the image, the light sources included in the dimming blocks that are not adjacent to each other may emit light of maximum luminance. Accordingly, heat generated from the light source device 100 may not be concentrated at a particular position. In other words, heat may be distributed throughout the light source device 100, and partial overheating of the light source device 100 may not occur.

For example, an image may have an average picture level (APL) of 10% by image data. The APL may indicate a ratio of luminance of an image by image data to the maximum luminance of the image, which the display device can output.

An image having an APL of 10% may include an image in which a portion (10% of the image) of the image is at the maximum brightness and another portion (90% of the image) of the image is at the minimum brightness, as well as an image in which the entire image is at 10% of the maximum brightness.

When the brightness of the entire image is 10% of the maximum brightness, the dimming blocks of the light source device 100 may emit light of 10% of the maximum luminance. In addition, the light sources of each of the dimming blocks may emit light of 10% of the maximum intensity. As a result, heat generation of the light sources may be low.

On the other hand, when a portion (10% of the image) of the image is at maximum brightness and another portion (90% of the image) of the image is at minimum brightness, some of the dimming blocks of the light source device 100 may emit light of maximum luminance. In addition, the light sources included in the dimming blocks that emit light of maximum luminance may emit light of maximum intensity. Accordingly, some of the light sources of the light source device 100 may emit a large amount of heat, and the light source device 100 may be locally overheated.

In order to prevent the partial overheating of the light source device 100, the image processor 90 of the display device 10 may track the driving current supplied to the light sources 111 included in each of the plurality of dimming blocks 200. The image processor 90 may identify whether a driving current of a maximum value is supplied to the light sources included in the dimming blocks adjacent to each other. In addition, the image processor 90 may limit a value of a current supplied to the light sources in response to the driving current of a maximum value being supplied to the light sources included in the dimming blocks adjacent to each other.

Hereinafter, an operation of the display device 10 for preventing partial overheating of the light source device 100 will be described.

Figure 9:
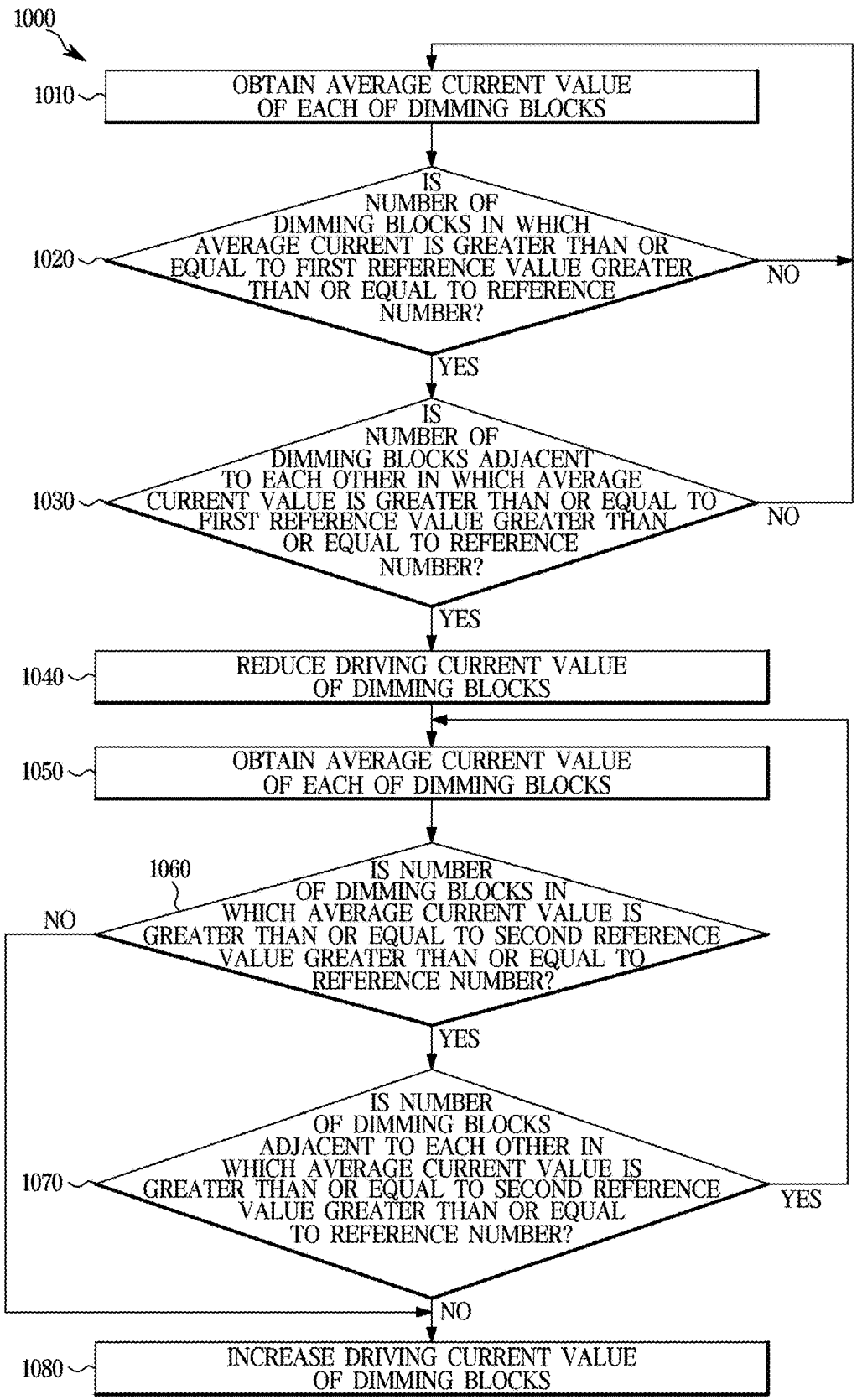
FIG. 9 illustrates a method of preventing or suppressing overheating of the light source device included in the display device, according to an embodiment.
Figure 10:
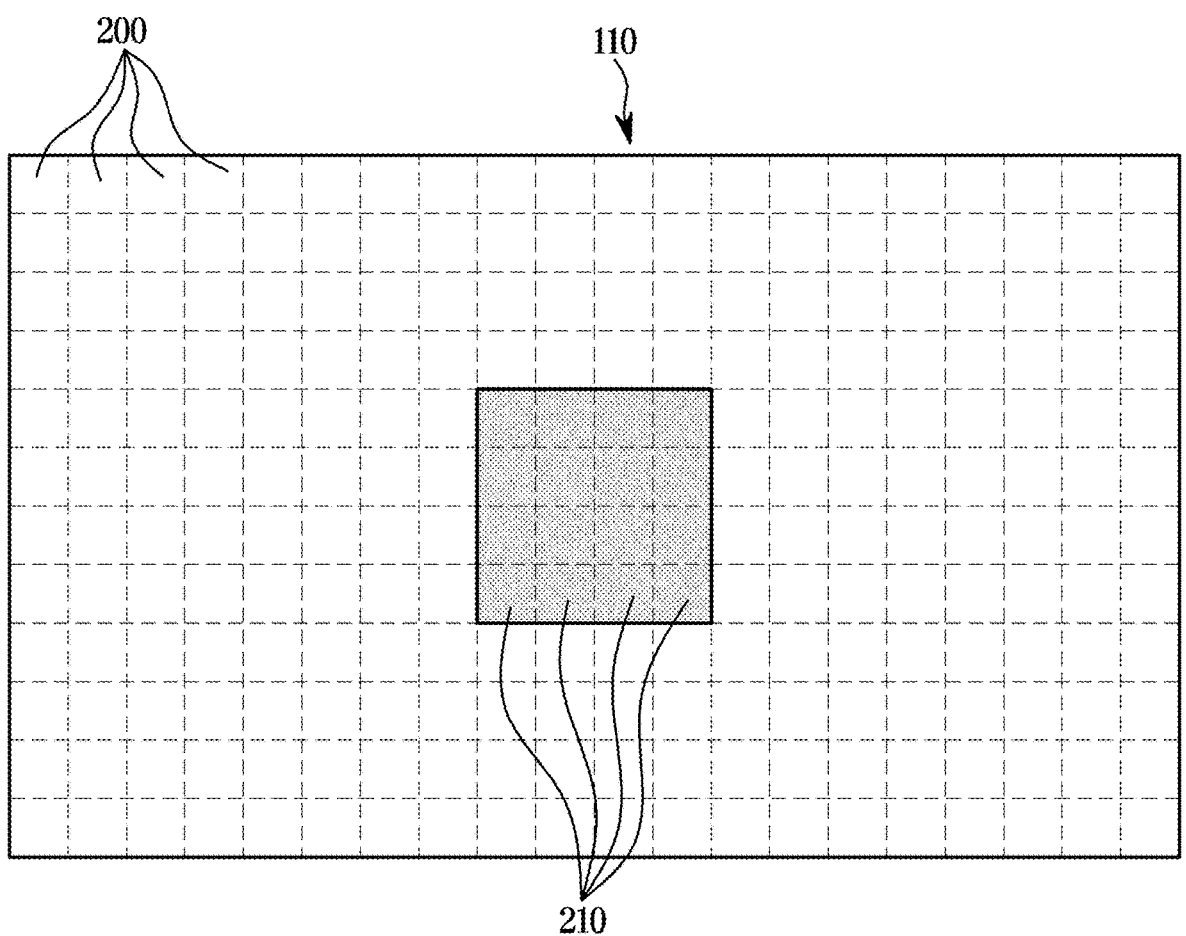
FIG. 10 illustrates an example of dimming blocks that output light of maximum intensity among the dimming blocks of the light source device included in the display device, according to an embodiment.
Figure 11:
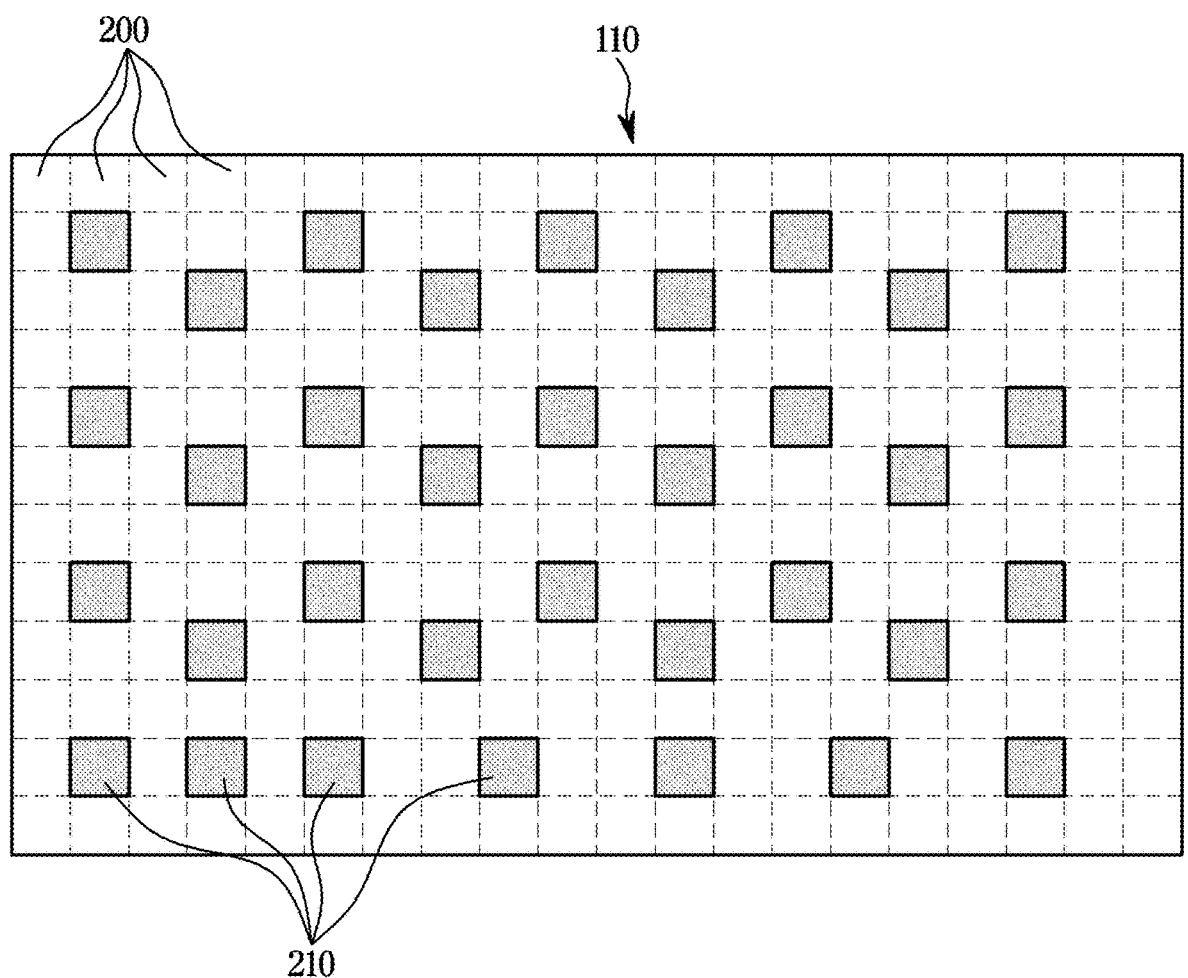
FIG. 11 illustrates another example of dimming blocks that output light of maximum intensity among the dimming blocks of the light source device included in the display device, according to an embodiment.
Figure 12:
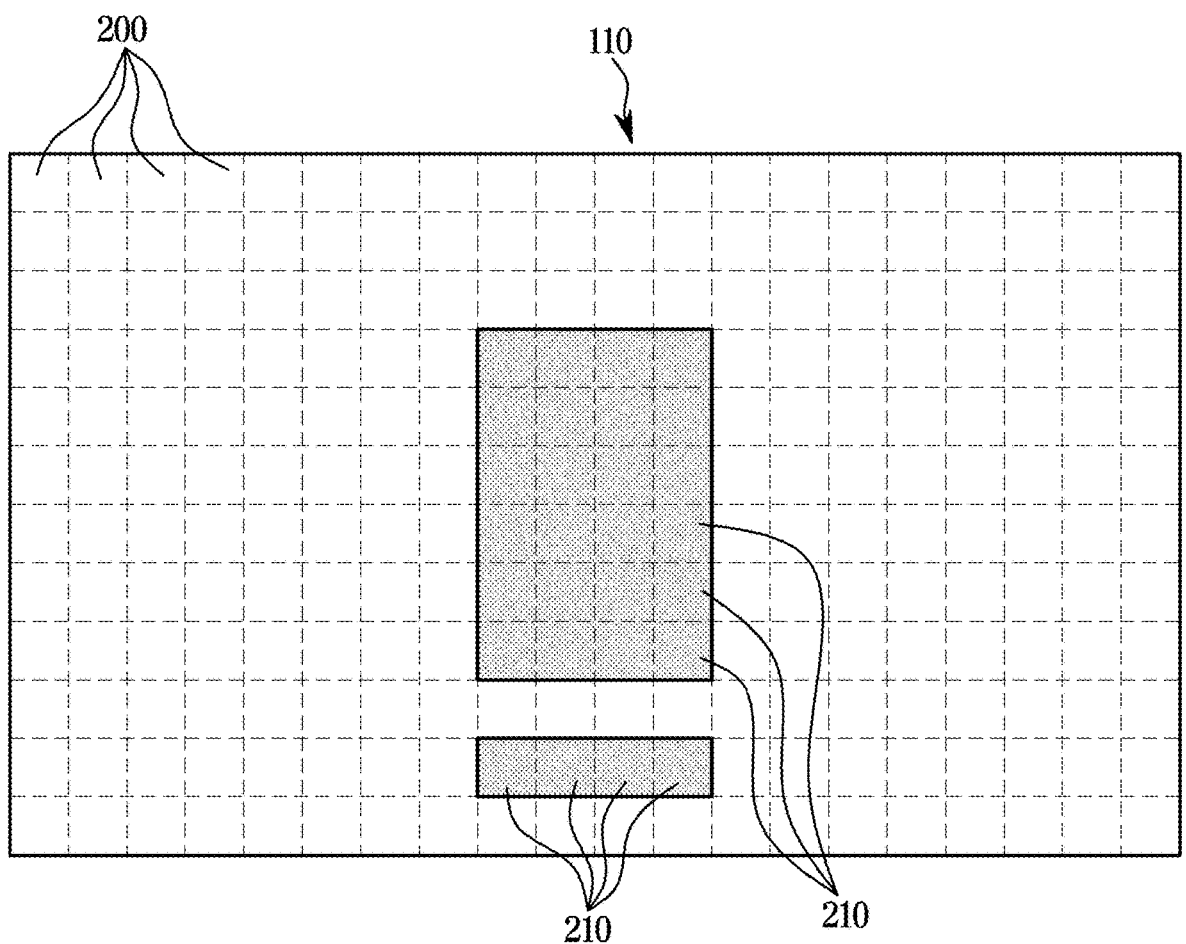
FIG. 12 illustrates still another example of dimming blocks that output light of maximum intensity among the dimming blocks of the light source device included in the display device, according to an embodiment.

FIG. 9 illustrates a method of preventing or suppressing overheating of the light source device included in the display device according to an embodiment. FIG. 10 illustrates an example of dimming blocks that output light of maximum intensity among the dimming blocks of the light source device included in the display device according to an embodiment. FIG. 11 illustrates another example of dimming blocks that output light of maximum intensity among the dimming blocks of the light source device included in the display device according to an embodiment. FIG. 12 illustrates still another example of dimming blocks that output light of maximum intensity among the dimming blocks of the light source device included in the display device according to an embodiment.

An example of a method 1000 of preventing or suppressing partial overheating of the light source device 100 will be described in conjunction with FIGS. 9, 10, 11, and 12.

The display device 10 may obtain an average current value of each of the dimming blocks 200 of the light source device 100 (1010).

The image processor 90 may decode a video signal into image data. In addition, the image processor 90 may obtain dimming data from the image data.

The dimming data may include information about an intensity of light emitted by each of the plurality of light sources (or the plurality of dimming blocks) included in the light source device 100. The dimming driver 170 may convert the dimming data, which is a digital voltage signal, into an analog driving current. The dimming driver 170 may provide the analog driving current to the light source module 110.

The image processor 90 may identify a value of a driving current supplied to the light sources of each of the plurality of dimming blocks 200 from the dimming data. In other words, the image processor 90 may identify the value of the driving current supplied to the light sources of each of the plurality of dimming blocks 200 by corresponding to an intensity of light emitted by each of the plurality of dimming blocks 200.

The image processor 90 may identify a value of a driving current supplied to each of the plurality of dimming blocks 200 every predetermined cycle, and store the driving current values. For example, the image processor 90 may identify a value of a driving current supplied to each of the plurality of dimming blocks 200 every 30 seconds, and store the driving current values.

The image processor 90 may obtain an average of values of currents supplied to each of the plurality of dimming blocks 200 for a predetermined reference time (for example, between 5 minutes and 10 minutes). For example, the image processor 90 may memorize or store values of currents supplied to each of the plurality of dimming blocks 200 for a predetermined reference time, and calculate an average value thereof. In another example, the image processor 90 may obtain an average of values of currents supplied to each of the plurality of dimming blocks 200 for a predetermined reference time by using an averaging filter.

The image processor 90 may store or memorize, in the memory 92, a matrix of average current values corresponding to the arrangement of the plurality of dimming blocks 200 arranged in a matrix form.

The display device 10 may identify whether the number of dimming blocks in which an average current value is greater than or equal to a first reference value is greater than or equal to a reference number (1020).

The image processor 90 may compare an average current value of currents supplied to the light sources of each of the plurality of dimming blocks 200 with the first reference value, and identify "first maximum lighting blocks" 210 in which the average current value is greater than or equal to the first reference value.

Here, the first reference value may be between a maximum value of driving currents supplied to the light sources 111 and a value of approximately 90% of the maximum value of the driving currents. For example, the first reference value may be a value of a current supplied to the light sources 111 such that the light sources 111 emit light between approximately 90% of the maximum brightness and the maximum brightness.

The image processor 90 may identify dimming blocks that emit light of approximately maximum brightness for a predetermined reference time by identifying second maximum lighting blocks. In other words, the image processor 90 may identify dimming blocks that maximally emit heat for a predetermined reference time by identifying the first maximum lighting blocks in which an average current value is greater than or equal to the first reference value.

The image processor 90 may identify the number of the first maximum lighting blocks 210 (dimming blocks in which a driving current greater than or equal to the first reference value is supplied to the light sources during the reference time, dimming blocks that emit light of maximum intensity, or dimming blocks including light sources that maximally emit heat).

The image processor 90 may compare the number of the first maximum lighting blocks 210 with the reference number. In addition, the image processor 90 may identify whether the number of the first maximum lighting blocks 210 is greater than or equal to the reference number.

The reference number may indicate the number of the first maximum lighting blocks 210 that may be locally overheated by being arranged adjacent to each other. In other words, when the first maximum lighting blocks 210 of the reference number or more are arranged adjacent to each other, the light source device 100 may be locally overheated.

For example, the reference number may indicate the number of dimming blocks corresponding to an APL of 10%. In other words, the reference number may be 10% of the number of all the dimming blocks 200 of the light source device 100. As shown in FIG. 7 described above, when the light source device 100 includes 240 dimming blocks 200, the reference number corresponding to the APL of 10% may be "24."

When the number of dimming blocks in which the average current value is greater than or equal to the first reference value is not greater than or equal to the reference number (No in 1020), the display device 10 may obtain an average current value of each of the dimming blocks 200 of the light source device 100 (1010).

For example, as shown in FIG. 10, the number of dimming blocks in which an average current value is greater than or equal to the first reference value may be "16" in the light source device 100 including a total of 240 dimming blocks 200.

As such, when the number of the first maximum lighting blocks 210 is less than "24," which is the reference number corresponding to the APL of 10%, the light source device 100 may not be overheated.

Accordingly, the image processor 90 may re-obtain an average current value of each of the dimming blocks 200 of the light source device 100 in a next cycle. In addition, the image processor 90 may identify whether the number of the first maximum lighting blocks 210 is greater than or equal to the reference number.

When the number of the dimming blocks in which the average current value is greater than or equal to the first reference value is greater than or equal to the reference number (Yes in 1020), the display device 10 may identify whether the number of the dimming blocks adjacent to each other, in which the average current value is greater than or equal to the first reference value, is greater than or equal to a reference number (1030).

The image processor 90 may identify the dimming blocks arranged adjacent to each other among the first maximum lighting blocks 210.

For example, each of the plurality of dimming blocks 200 may be given an identifier capable of identifying the dimming block. The identifier may include coordinates (e.g., an integer representing a column and an integer representing a row, each of which is hereinafter referred to as a "column number" and a "row number") indicating a relative position in the plurality of dimming blocks 200 arranged in a matrix form.

The image processor 90 may identify coordinates (e.g., column numbers and row numbers) of the first maximum lighting blocks 210, and identify the first maximum lighting blocks 210 adjacent to each other based on the coordinates of the first maximum lighting blocks 210.

For example, the image processor 90 may identify the first maximum lighting blocks 210, in which the column numbers are integers adjacent to each other and/or the row numbers are integers adjacent to each other, among the first maximum lighting blocks 210 as the first maximum lighting blocks 210 arranged adjacent to each other. The image processor 90 may identify the first maximum lighting blocks 210, in which both the column numbers and the row numbers are integers not adjacent to each other, among the first maximum lighting blocks 210 as the first maximum lighting blocks 210 that are not arranged adjacent to each other.

In addition, the image processor 90 may identify the number of the first maximum lighting blocks 210 arranged adjacent to each other, and compare the number of the first maximum lighting blocks 210 arranged adjacent to each other with the reference number. Accordingly, the image processor 90 may identify whether the number of the first maximum lighting blocks 210 arranged adjacent to each other is greater than or equal to the reference number.

As described above, the reference number may indicate the number of the first maximum lighting blocks 210 that maybe locally overheated by being arranged to be adjacent to each other. For example, the reference number may indicate the number of dimming blocks corresponding to the APL of 10%.

When the number of dimming blocks arranged adjacent to each other, in which the average current value is greater than or equal to the first reference value, is not greater than or equal to the reference number (No in 1030), the display device 10 may obtain an average current value of each of the dimming blocks 200 of the light source device 100 (1010).

For example, as shown in FIG. 11, in the light source device 100 including a total of 240 dimming blocks 200, the number of the first maximum lighting blocks 210 may be "34." However, the "34" first maximum lighting blocks 210 may not all be adjacent to each other.

As such, even when the number of the first maximum lighting blocks is greater than "24," which is the reference number corresponding to the APL of 10%, the light source device 100 may not be locally overheated when the first maximum lighting blocks 210 are not arranged adjacent to each other.

Heat emitted from the first maximum lighting blocks 210 may not be accumulated and may propagate to adjacent dimming blocks having a low temperature. Accordingly, the temperature of the first maximum lighting blocks 210 may not rise.

Accordingly, the image processor 90 may re-obtain an average current value of each of the dimming blocks 200 of the light source device 100 in a next cycle. In addition, the image processor 90 may identify whether the number of the first maximum lighting blocks 210 arranged adjacent to each other is greater than or equal to the reference number.

When the number of the dimming blocks arranged adjacent to each other, in which the average current value is greater than or equal to the first reference value, is greater than or equal to the reference number (Yes in 1030), the display device 10 may reduce the driving current value of the dimming blocks 200 (1040).

For example, as shown in FIG. 12, in the light source device 100 including a total of 240 dimming blocks 200, the number of the first maximum lighting blocks 210 may be "28." In addition, among the "28" first maximum lighting blocks 210, "24" first maximum lighting blocks 210 may be arranged adjacent to each other.

As such, when the number of the first maximum lighting blocks 210 arranged adjacent to each other is greater than or equal to "24," which is the reference number corresponding to the APL of 10%, the light source device 100 may be locally overheated.

Since the first maximum lighting blocks 210 are arranged adjacent to each other, heat emitted from the first maximum lighting blocks 210 may not propagate to adjacent dimming blocks and may be accumulated in the first maximum lighting blocks 210. Accordingly, the temperature of the first maximum lighting blocks 210 arranged adjacent to each other may rise continuously.

The image processor 90 may reduce the driving current supplied to the light sources of the dimming blocks 200 in order to prevent or suppress the local overheating of the light source device 100.

The image processor 90 may reduce the maximum current value of currents that may be supplied to the light sources 111. In addition, the image processor 90 may reduce the value of the driving current supplied to the light sources 111 according to the reduction of the maximum current value corresponding to the maximum brightness. For example, the image processor 90 may reduce the maximum current value corresponding to the maximum brightness by approximately 25%, thereby reducing the value of the driving current supplied to the light sources 111 by approximately 25%.

As such, by reducing the maximum current value, the value of the driving current supplied to each of the light sources 111 may be reduced, and the average current value of the light sources 111 may also be reduced. As a result, the temperature of the dimming blocks that have been overheated may be reduced.

Thereafter, the display device 10 may obtain an average current value of each of the dimming blocks 200 of the light source device 100 (1050).

Operation 1050 may be the same as operation 1010 described above. In this case, due to the reduction of the value of the driving current supplied to the light sources 111, an average of values of currents supplied to each of the plurality of dimming blocks 200 for a predetermined reference time may also be reduced.

The display device 10 may identify whether the number of the dimming blocks in which the average current value is greater than or equal to a second reference value is greater than or equal to a reference number (1060).

The image processor 90 may compare the average current value of the currents supplied to the light sources included in each of the plurality of dimming blocks 200 with the second reference value. In addition, the image processor 90 may identify "second maximum lighting blocks" in which the average current value is greater than or equal to the second reference value.

Here, the second reference value may be a value less than the first reference value. For example, the second reference value may be a value reduced from the first reference value by a percentage by which the driving current value is reduced in operation 1040. For example, when the driving current value is reduced by approximately 25% in operation 1040, the second reference value may be a value reduced by 25% from the first reference value. The second reference value may be between 75% and 67.5% of a maximum value of currents that can be supplied to the light sources 111.

By identifying the second maximum lighting blocks, the image processor 90 may identify dimming blocks that emit light at approximately 75% of the maximum brightness for a predetermined reference time (e.g., between 5 minutes and 10 minutes).

The image processor 90 may identify the number of the second maximum lighting blocks. The image processor 90 may compare the number of the second maximum lighting blocks with the reference number and identify whether the number of the second maximum lighting blocks is greater than or equal to the reference number. Here, the reference number may be the same as the reference number of operation 1020 and the reference number of operation 1030.

When the number of the dimming blocks in which the average current value is greater than or equal to the second reference value is not greater than or equal to the reference number (No in 1060), the display device 10 may increase the driving current value of the dimming blocks 200 (1080).

When the number of the second maximum lighting blocks is not greater than or equal to the reference number and the number of the second maximum lighting blocks arranged adjacent to each other is not greater than or equal to the reference number, it may be expected that local heating of the light source device 100 may be reduced. Accordingly, the image processor 90 may restore the value of the driving current supplied to the light sources of the dimming blocks 200 to the value prior to the reduction of the driving current in order to improve the luminance and contrast ratio of the display device 10.

The image processor 90 may increase the maximum current value of currents that can be supplied to the light sources 111. In addition, the image processor 90 may increase the value of the driving current supplied to the light sources 111 according to the increase of the maximum current value corresponding to the maximum brightness. For example, the image processor 90 may increase the maximum current value corresponding to the maximum brightness by approximately 33% (by 33% to restore a corrected current value of 75% to a current value of 100%). In addition, the image processor 90 may also increase the value of the driving current supplied to the light sources 111 by approximately 33%.

When the number of the dimming blocks in which the average current value is greater than or equal to the second reference value is greater than or equal to the reference number (Yes in 1060), the display device 10 may identify whether the number of the dimming blocks adjacent to each other, in which the average current value is greater than or equal to the second reference value, is greater than or equal to a reference number (1070).

When the number of the second maximum lighting blocks is still greater than or equal to the reference number, it may be expected that a large number of dimming blocks emit light of a corrected maximum intensity (an intensity that is reduced by 25% from the maximum intensity of the dimming blocks). At this time, when the driving current supplied to the light sources of the dimming blocks 200 is increased, the light source device 100 may be locally overheated.

The image processor 90 may identify the second maximum lighting blocks arranged adjacent to each other among the second maximum lighting blocks without increasing the driving current supplied to the light sources of the dimming blocks 200. The image processor 90 may identify coordinates (e.g., column numbers and row numbers) of the second maximum lighting blocks, and identify the second maximum lighting blocks adjacent to each other based on the coordinates of the second maximum lighting blocks.

The image processor 90 may identify the number of the second maximum lighting blocks arranged adjacent to each other. In addition, the image processor 90 may identify whether the number of the second maximum lighting blocks arranged adjacent to each other is greater than or equal to the reference number.

When the number of the dimming blocks arranged adjacent to each other, in which the average current value is greater than or equal to the second reference value, is greater than or equal to the reference number (Yes in 1070), the display device 10 may obtain an average current value of each of the dimming blocks 200 of the light source device 100 (1050).

When the number of the second maximum lighting blocks arranged adjacent to each other is still greater than or equal to the reference number, it is expected that a large number of dimming blocks arranged adjacent to each other emit light of a corrected maximum intensity (an intensity that is reduced by 25% from the maximum intensity of the dimming blocks). Accordingly, the image processor 90 may re-obtain the average current value of each of the dimming blocks 200 without increasing the driving current supplied to the light sources of the dimming blocks 200.

When the number of the dimming blocks arranged adjacent to each other, in which the average current value is greater than or equal to the second reference value, is not greater than or equal to the reference number (No in 1060), the display device 10 may increase the driving current value of the dimming blocks 200 (1080).

When the number of the second maximum lighting blocks arranged adjacent to each other is not greater than or equal to the reference number, the local heating of the light source device 100 may be expected to be reduced. Accordingly, the image processor 90 may restore the value of the driving current supplied to the light sources of the dimming blocks 200 to the value prior to the reduction of the driving current in order to improve the luminance and contrast ratio of the display device 10.

As described above, the display device 10 may reduce the current supplied to the light sources of the dimming blocks 200 on the basis that the number of the dimming blocks in which the average current value is greater than or equal to the reference value is greater than or equal to the reference number.

Accordingly, local overheating of the light source device 100 due to the concentration of the light sources to which the maximum current is supplied may be prevented or suppressed. In addition, by preventing or suppressing the local overheating of the light source device 100, the display device 10 may supply the maximum current that can be supplied to the light sources 111 of the light source device 100 without any current reduction for preventing overheating. In addition, luminance of the display device 10 maybe increased, and a contrast ratio thereof may be increased.

By obtaining the average current value of the currents supplied to all the light sources of the dimming blocks 200, computational load of the processor 91 of the image processor 90 may increase, and storage load of the memory 92 for storing the average current value may also increase.

In order to reduce the computational load of the processor 91 and reduce the storage load of the memory 92, the plurality of dimming blocks 200 may be classified into a plurality of block groups 300.

Figure 13:
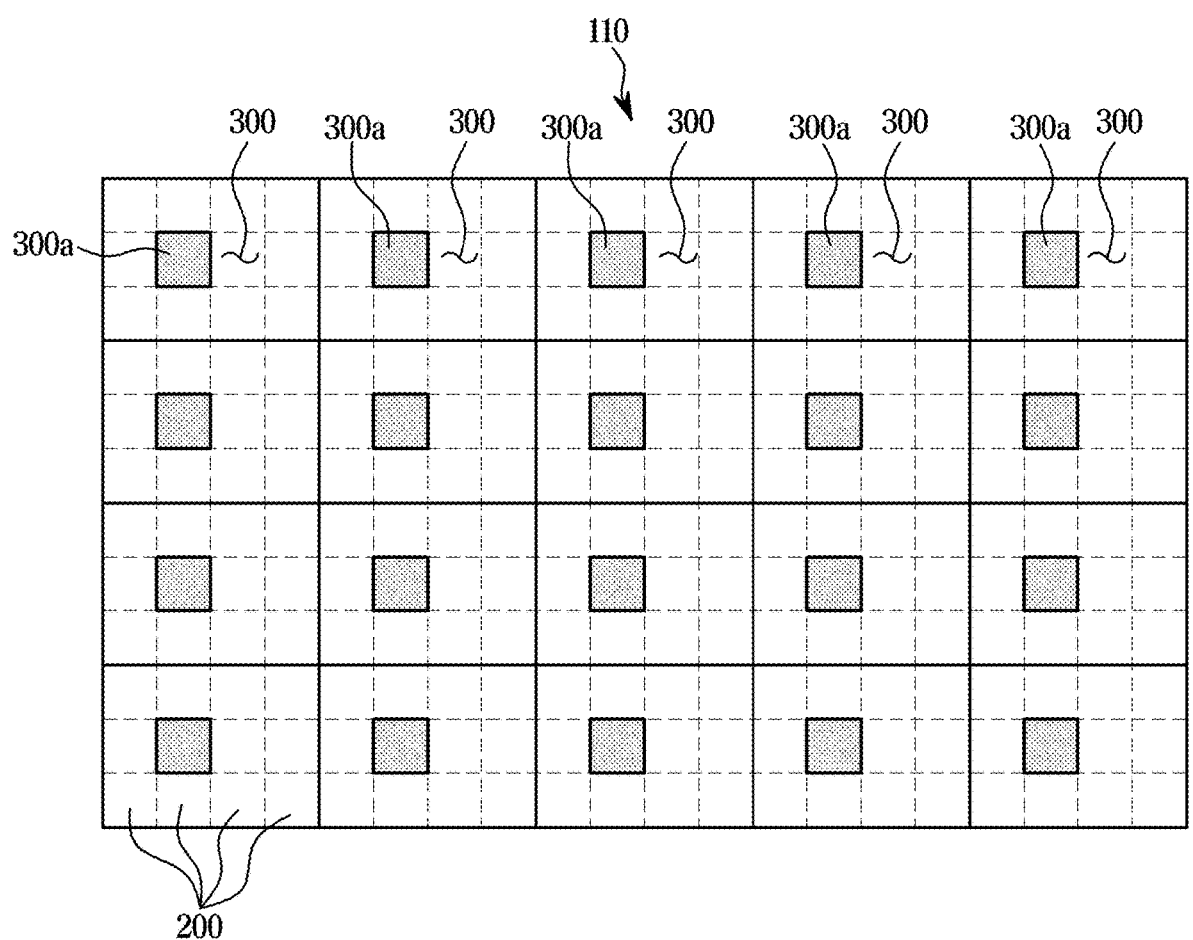
FIG. 13 illustrates an example of dimming block groups of the light source device included in the display device according to an embodiment.

FIG. 13 illustrates an example of the dimming block groups of the light source device included in the display device according to an embodiment.

For example, as shown in FIG. 13, the light source device 100 may include a total of 240 dimming blocks 200, 20 horizontally×12 vertically, and vertical, and the 240 dimming blocks 200 may be categorized into 20 block groups 300 that are 5*4 in horizontal and vertical directions.

Some of the block groups 300 may be arranged at positions adjacent to each other. Being arranged at positions adjacent to each other may indicate that they share one of four sides that define each of the rectangular block groups 300.

Each of the block groups 300 may include 12 dimming blocks that are 4*3 in horizontal and vertical. In addition, the block groups 300 may include representative blocks 300a, respectively. Each of the representative blocks 300a may be located at an approximate center of each of the block groups 300.

A driving current supplied to the plurality of light sources included in each of the representative blocks 300a may be representative of the block group including the representative block. The driving current supplied to the light sources of the representative block may be assumed to be a driving current supplied to the light sources of the block group by using spatial continuity of image data.

The image processor 90 may track the driving current supplied to the light sources of each of the representative blocks 300a as the driving current of the block group. For example, the image processor 90 may store the driving current supplied to the light sources of each of the representative blocks 300a every predetermined cycle.

The image processor 90 may obtain an average value of the driving current supplied to the light sources of each of the representative blocks 300a. For example, the image processor 90 may average driving currents supplied to the light sources of each of the representative blocks 300a for a predetermined reference time.

The image processor 90 may identify whether the average value of the driving currents supplied to the light sources of each of the representative blocks 300a is greater than or equal to a predetermined reference current value. For example, the image processor 90 may compare the average value of the driving currents supplied to the light sources of each of the representative blocks 300a with the reference current value. The image processor 90 may identify whether the average value of the driving currents supplied to the light sources of each of the representative blocks 300a is greater than or equal to the reference current value.

The image processor 90 may identify whether the light source device 100 is partially overheated, based on the number and arrangement of the block groups in which the average value of the driving currents supplied to the light sources of each of the representative blocks 300a is greater than or equal to the reference current value.

The image processor 90 may reduce the driving current supplied to all the light sources of the dimming blocks 200 based on the identified partial overheating of the light source device 100. Accordingly, the partial overheating of the light source device 100 may be prevented.

Figure 14:
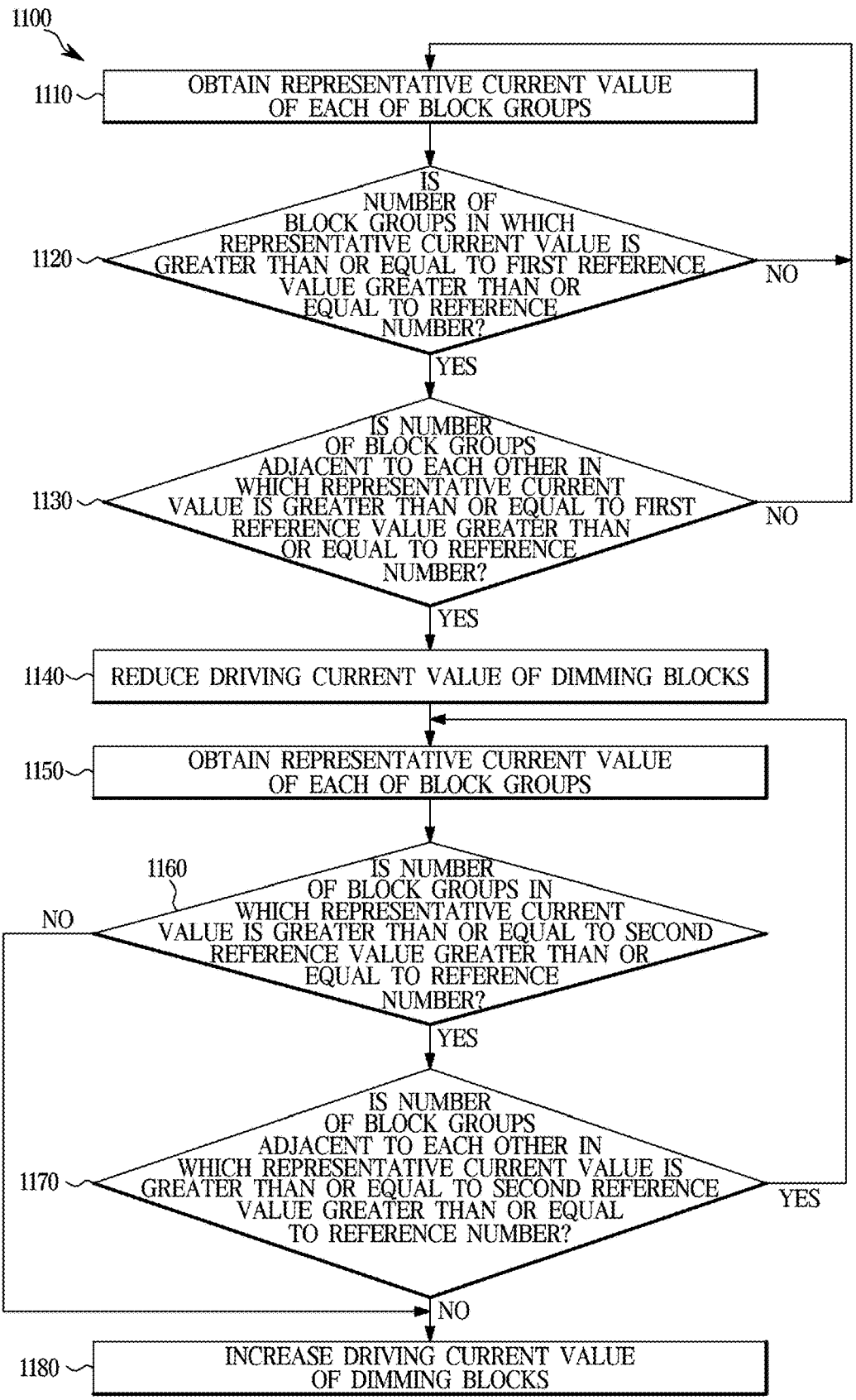
FIG. 14 illustrates a method of preventing or suppressing overheating of the light source device included in the display device, according to an embodiment.
Figure 15:
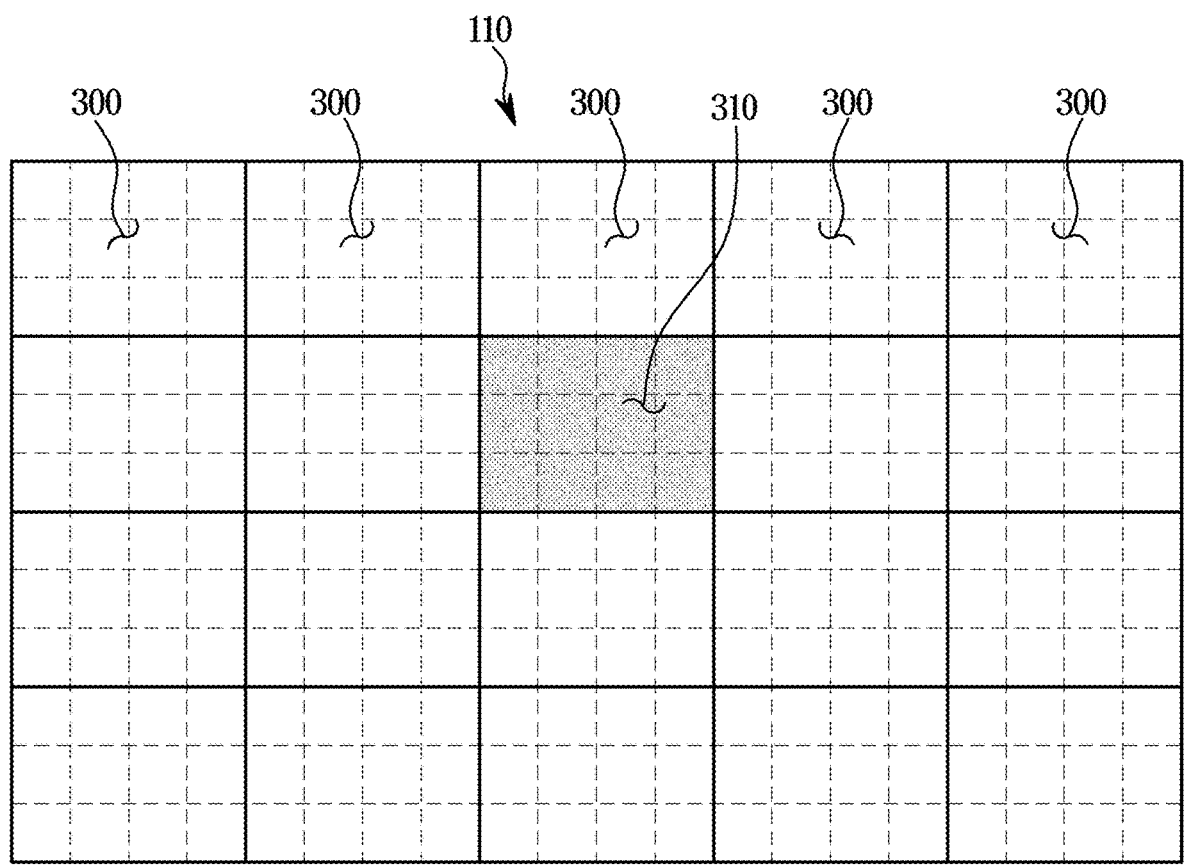
FIG. 15 illustrates an example of block groups that output light of maximum intensity among the block groups of the light source device included in the display device, according to an embodiment.
Figure 16:
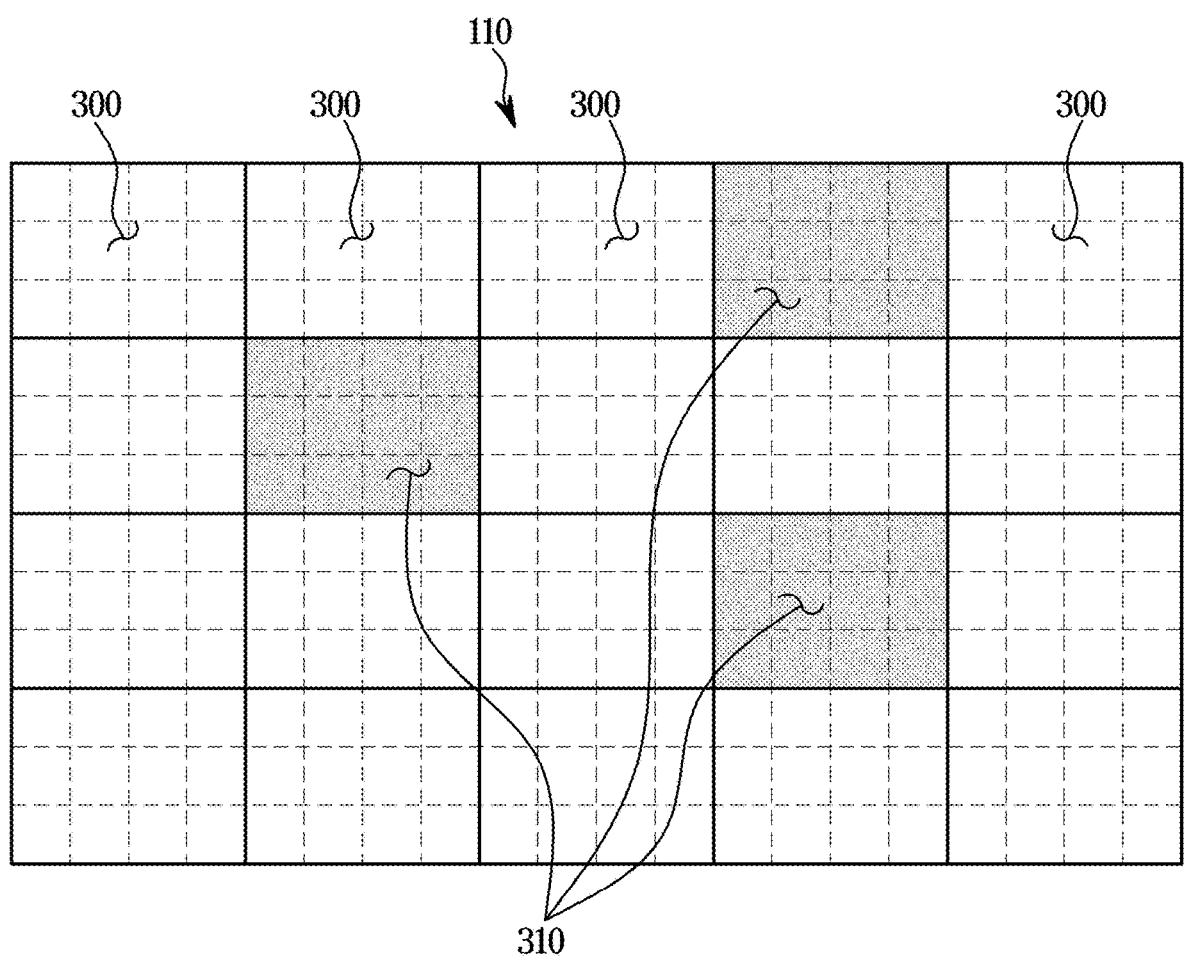
FIG. 16 illustrates another example of block groups that output light of maximum intensity among the block groups of the light source device included in the display device, according to an embodiment.
Figure 17:
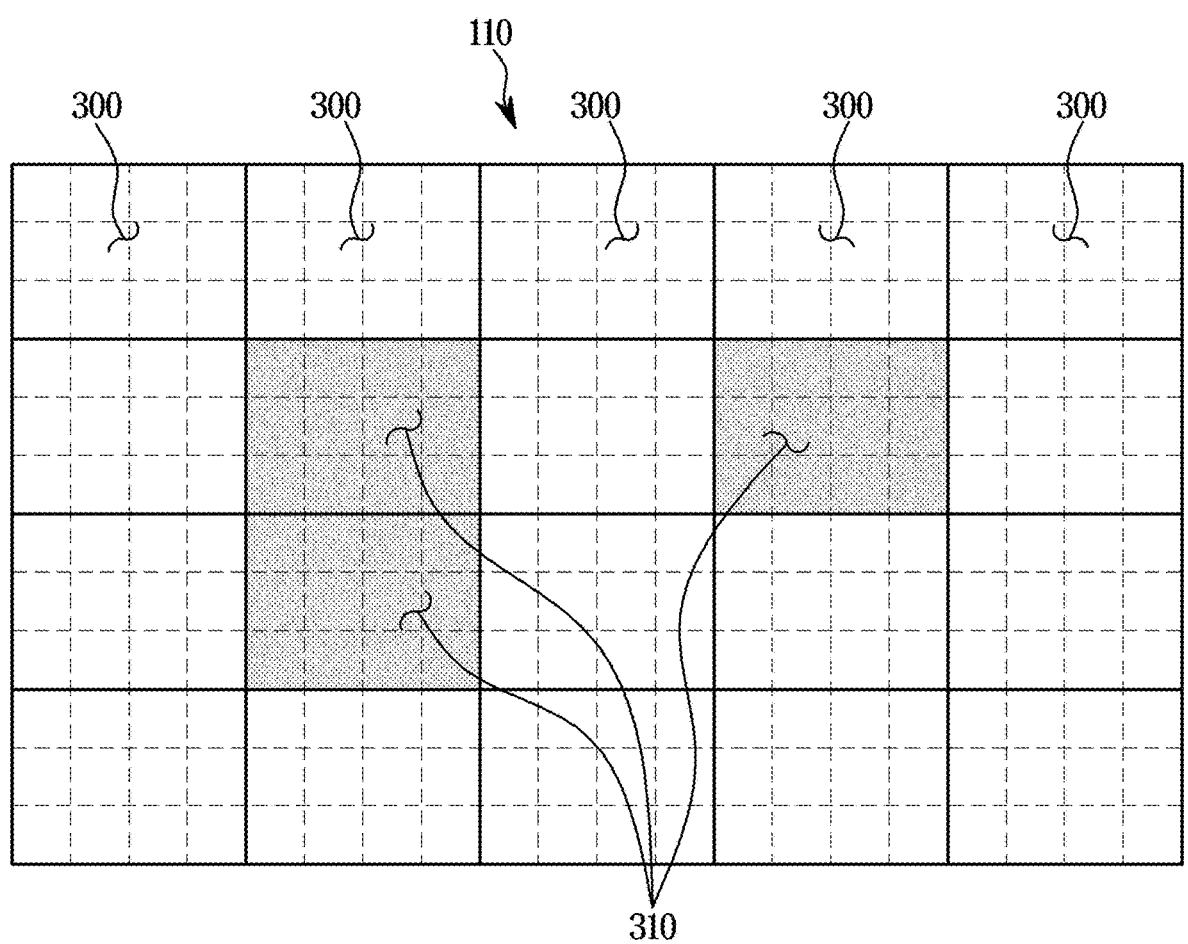
FIG. 17 illustrates still another example of block groups that output light of maximum intensity among the block groups of the light source device included in the display device, according to an embodiment.

FIG. 14 illustrates a method of preventing or suppressing overheating of the light source device included in the display device according to an embodiment. FIG. 15 illustrates an example of block groups that output light of maximum intensity among the block groups of the light source device included in the display device according to an embodiment. FIG. 16 illustrates another example of block groups that output light of maximum intensity among the block groups of the light source device included in the display device according to an embodiment. FIG. 17 illustrates still another example of block groups that output light of maximum intensity among the block groups of the light source device included in the display device according to an embodiment.

An example of a method 1100 of preventing or suppressing partial overheating of the light source device 100 will be described in conjunction with FIGS. 14, 15, 16, and 17.

The display device 10 may obtain a representative current value of each of the block groups 300 (1110).

Here, the representative current value of each of the block groups 300 may represent an average current value of the representative block 300*a* of each of the block groups 300. The representative block 300*a* may be the dimming block located at an approximately center of each of the block groups 300.

The image processor 90 may obtain dimming data from the image data. The image processor 90 may obtain an average current value of currents supplied to the light sources of each of the representative blocks 300*a* from the dimming data. The image processor 90 may identify a value of a driving current supplied to the light sources of the representative blocks 300*a* by corresponding to an intensity of light emitted by the representative blocks 300*a*.

The image processor 90 may identify a value of a driving current supplied to the light sources of each of the representative blocks 300*a* every predetermined cycle, and store the driving current values. The image processor 90 may obtain an average value of currents supplied to the light sources of each of the representative blocks 300*a* for a predetermined reference time (for example, between 5 minutes and 10 minutes).

The average value of the currents supplied to the light sources of each of the representative blocks 300*a* may represent the representative current value.

The image processor 90 may store or memorize, in the memory 92, a matrix of representative current values corresponding to the arrangement of the representative blocks 300*a* arranged in a matrix form.

The display device 10 may identify whether the number of the block groups in which the representative current value is greater than or equal to a first reference value is greater than or equal to a reference number (1120).

The image processor 90 compares the average current value (hereinafter referred to as the "representative current value") of the currents supplied to the light sources included in each of representative blocks 300*a* respectively representing the plurality of block groups 300 with the first reference value. In addition, the image processor 90 may identify "first maximum lighting groups" in which the representative current value is greater than or equal to the first reference value. Here, the first reference value may be between the maximum current value of currents supplied to the light sources and a value of approximately 90% of the maximum current value.

The image processor 90 may identify the block groups that emit (or emit the maximum heat) light of approximately maximum brightness for the predetermined reference time by identifying the first maximum lighting groups.

The image processor 90 may identify the number of the first maximum lighting groups. In addition, the image processor 90 may identify whether the number of the first maximum lighting groups is greater than or equal to the reference number.

The reference number may indicate the number of the first maximum lighting groups that may be locally overheated by being arranged adjacent to each other. In other words, when the first maximum lighting groups of the reference number or more are arranged adjacent to each other, the light source device 100 may be locally overheated.

For example, the reference number may indicate the number of the block groups corresponding to an APL of 10%. As shown in FIG. 13 described above, when the light source device 100 includes 20 block groups 300, the reference number corresponding to the APL of 10% may be "2."

When the number of the dimming blocks in which the representative current value is greater than or equal to the first reference value is not greater than or equal to the reference number (No in 1120), the display device 10 may obtain a representative current value of each of the block groups 300 of the light source device 100 (1110).

For example, as shown in FIG. 15, the number of the block groups in which the representative current value is greater than or equal to the first reference value may be "1" in the light source device 100 including a total of 20 block groups 300.

As such, when the number of the first maximum lighting groups is less than "2," which is the reference number corresponding to the APL of 10%, the light source device 100 may not be overheated.

Accordingly, the image processor 90 may re-obtain a representative current value of each of the block groups 300 in a next cycle. In addition, the image processor 90 may identify whether the number of the first maximum lighting groups is greater than or equal to the reference number.

When the number of the block groups, in which the representative current value is greater than or equal to the first reference value, is greater than or equal to the reference number (Yes in 1120), the display device 10 may identify whether the number of the block groups adjacent to each other, in which the representative current value is greater than or equal to the first reference value, is greater than or equal to a reference number (1130).

The image processor 90 may identify the block groups arranged adjacent to each other among the first maximum lighting groups.

For example, each of the plurality of block groups 300 may be given coordinates (e.g., an integer representing a column and an integer representing a row, each of which is hereinafter referred to as a "column number" and a "row number") indicating a relative position in the plurality of block groups 300.

The image processor 90 may identify coordinates (e.g., column numbers and row numbers) of the first maximum lighting groups, and identify the first maximum lighting groups adjacent to each other based on the coordinates of the first maximum lighting groups.

In addition, the image processor 90 may identify the number of the first maximum lighting groups arranged adjacent to each other, and compare the number of the first maximum lighting groups arranged adjacent to each other with the reference number. Accordingly, the image processor 90 may identify whether the number of the first maximum lighting groups arranged adjacent to each other is greater than or equal to the reference number.

As described above, the reference number may indicate the number of the first maximum lighting groups that may be locally overheated by being arranged to be adjacent to each other. For example, the reference number may indicate the number of the block groups corresponding to the APL of 10%.

When the number of the dimming blocks arranged adjacent to each other, in which the representative current value is greater than or equal to the first reference value, is not greater than or equal to the reference number (No in 1130), the display device 10 may obtain a representative current value of each of the block groups 300 of the light source device 100 (1110).

For example, as shown in FIG. 16, in the light source device 100 including a total of 20 block groups 300, the number of the first maximum lighting groups may be "3." However, the "3" first maximum lighting groups may not all be adjacent to each other.

As such, even when the number of the first maximum lighting groups is greater than "2," which is the reference number corresponding to the APL of 10%, the light source device 100 may not be locally overheated when first maximum lighting groups 310 are not arranged adjacent to each other.

Heat emitted from the first maximum lighting groups 310 may not be accumulated and may propagate to adjacent block groups having a low temperature. Accordingly, the temperature of the first maximum lighting groups 310 may not rise.

Accordingly, the image processor 90 may re-obtain a representative current value of each of the block groups 300 of the light source device 100 in a next cycle. In addition, the image processor 90 may identify whether the number of the first maximum lighting groups 310 arranged adjacent to each other is greater than or equal to the reference number.

When the number of the block groups arranged adjacent to each other, in which the representative current value is greater than or equal to the first reference value, is greater than or equal to the reference number (Yes in 1130), the display device 10 may reduce the driving current value of the dimming blocks 200 (1140).

For example, as shown in FIG. 17, in the light source device 100 including a total of 20 block groups 300, the number of the first maximum lighting groups 310 maybe "3." In addition, among the "3" first maximum lighting groups 310, "2" first maximum lighting groups 310 maybe arranged adjacent to each other.

As such, when the number of the first maximum lighting groups 310 arranged adjacent to each other is greater than or equal to "2," which is the reference number corresponding to the APL of 10%, the light source device 100 may be locally overheated.

Since the first maximum lighting groups 310 are arranged adjacent to each other, heat emitted from the first maximum lighting groups 310 may not propagate to adjacent block groups and may be accumulated in the first maximum lighting groups 310. Accordingly, the temperature of the first maximum lighting blocks 210 arranged adjacent to each other may rise continuously.

The image processor 90 may reduce the driving current supplied to the light sources of the dimming blocks 200 in order to prevent or suppress the local overheating of the light source device 100. For example, the image processor 90 may reduce the maximum current value corresponding to the maximum brightness by approximately 25%, thereby reducing the value of the driving current supplied to the light sources 111 by approximately 25%. Accordingly, the temperature of the dimming blocks of the block groups that have been overheated may be reduced.

Thereafter, the display device 10 may obtain a representative current value of each of the block groups 300 of the light source device 100 (1150).

Operation 1150 may be the same as operation 1110 described above. In this case, due to the reduction of the value of the driving current supplied to the light sources 111, an average value of currents supplied to each of the representative blocks 300*a* for a predetermined reference time may also be reduced.

The display device 10 may identify whether the number of the block groups in which the representative current value is greater than or equal to a second reference value is greater than or equal to a reference number (1160).

The image processor 90 may compare an average current value of currents supplied to light sources included in each of the representative blocks 300*a* with the second reference value. In addition, the image processor 90 may identify "second maximum lighting groups" having the representative current value greater than or equal to the second reference value.

Here, the second reference value may be a value less than the first reference value. For example, the second reference value may be a value reduced from the first reference value by a percentage by which the driving current value is reduced in operation 1140. For example, when the driving current value is reduced by approximately 25% in operation 1140, the second reference value may be a value reduced by 25% from the first reference value. The second reference value may be between 75% and 67.5% of a maximum value of currents that can be supplied to the light sources 111.

By identifying the second maximum lighting groups, the image processor 90 may identify block groups including dimming blocks that emit light at approximately 75% of the maximum brightness for a predetermined reference time (e.g., between 5 minutes and 10 minutes).

The image processor 90 may identify the number of the second maximum lighting groups. The image processor 90 may compare the number of the second maximum lighting groups with the reference number and identify whether the number of the second maximum lighting groups is greater than or equal to the reference number. Here, the reference number may be the same as the reference number of operation 1120 and the reference number of operation 1130.

When the number of the block groups in which the representative current value is greater than or equal to the second reference value is not greater than or equal to the reference number (No in 1160), the display device 10 may increase the driving current value of the dimming blocks 200 (1180).

When the number of the second maximum lighting blocks arranged adjacent to each other is not greater than or equal to the reference number, the local heating of the light source device 100 may be expected to be reduced. Accordingly, the image processor 90 may restore the value of the driving current supplied to the light sources of the dimming blocks 200 to the value prior to the reduction of the driving current in order to improve the luminance and contrast ratio of the display device 10.

The image processor 90 may increase the maximum current value of currents that can be supplied to the light sources 111, and may increase the value of the driving current supplied to the light sources 111 according to the increase in the maximum current value.

When the number of the block groups in which the representative current value is greater than or equal to the second reference value is greater than or equal to the reference number (Yes in 1160), the display device 10 may identify whether the number of the block groups adjacent to each other, in which the representative current value is greater than or equal to the second reference value, is greater than or equal to a reference number (1170).

When the number of the second maximum lighting groups is still greater than or equal to the reference number, it may be expected that a large number of dimming blocks emit light of a corrected maximum intensity (an intensity that is reduced by 25% from the maximum intensity of the dimming blocks). At this time, when the driving current supplied to the light sources of the dimming blocks 200 is increased, the light source device 100 may be locally overheated.

The image processor 90 may identify the second maximum lighting groups arranged adjacent to each other among the second maximum lighting groups without increasing the driving current supplied to the light sources of the dimming blocks 200. In addition, the image processor 90 may identify the number of the second maximum lighting groups arranged adjacent to each other, and may identify whether the number of the second maximum lighting blocks arranged adjacent to each other is greater than or equal to the reference number.

When the number of the block groups arranged adjacent to each other, in which the representative current value is greater than or equal to the second reference value, is greater than or equal to the reference number (Yes in 1170), the display device 10 may obtain a representative current value of each of the block groups 300 (1150).

When the number of the second maximum lighting groups arranged adjacent to each other is still greater than or equal to the reference number, it is expected that a large number of dimming blocks arranged adjacent to each other emit light of a corrected maximum intensity (an intensity that is reduced by 25% from the maximum intensity of the dimming blocks). Accordingly, the image processor 90 may re-obtain the average current value of each of the representative blocks 300*a* without increasing the driving current supplied to the light sources of the dimming blocks 200.

When the number of the block groups arranged adjacent to each other, in which the representative current value is greater than or equal to the second reference value, is not greater than or equal to the reference number (No in 1170), the display device 10 may increase the driving current value of the dimming blocks 200 (1180).

When the number of the second maximum lighting blocks arranged adjacent to each other is not greater than or equal to the reference number, the local heating of the light source device 100 may be expected to be reduced. Accordingly, the image processor 90 may restore the value of the driving current supplied to the light sources of the dimming blocks 200 to the value prior to the reduction of the driving current in order to improve the luminance and contrast ratio of the display device 10.

As described above, the display device 10 may reduce the current supplied to the light sources of the dimming blocks 200 on the basis that the number of the block groups, in which the representative current value is greater than or equal to a reference value, is greater than or equal to the reference number.

Accordingly, local overheating of the light source device 100 due to the concentration of the light sources to which the maximum current is supplied may be prevented or suppressed. In addition, computational load of the processor 91 and storage load of the memory 92 for preventing the local overheating of the light source device 100 may be reduced.

A display device according to an embodiment includes a liquid crystal panel, a light source module including a plurality of light sources capable of emitting light toward the liquid crystal panel, wherein the plurality of light sources are divided into a plurality of dimming blocks each including one or more light sources, a driver configured to supply a current to each of the plurality of light sources, and a processor configured to control the driver to supply the current to the one or more light sources included in each of the plurality of dimming blocks based on image data. The processor may obtain an average current value of currents supplied to the one or more light sources included in each of the plurality of dimming blocks for a reference time based on the image data, and control the driver to supply a reduced current to the plurality of light sources based on the number or arrangement of first dimming blocks in which the average current value is greater than or equal to a first reference value.

As such, the display device may reduce the driving current based on the number or arrangement of the light sources emitting light of maximum intensity. Accordingly, local overheating of the light source device due to the local concentration of the light sources emitting the light of maximum intensity may be prevented or suppressed.

The processor may control the driver to supply the reduced current to the plurality of light sources based on the number of the first dimming blocks being greater than or equal to a reference number.

As such, the display device may reduce the driving current based on the number of the light sources emitting the light of maximum intensity without determining the arrangement of the light sources emitting the light of maximum intensity. Accordingly, computational load for determining the arrangement of the light sources emitting light of maximum intensity may be reduced.

The processor may control the driver to supply the reduced current to the plurality of light sources based on the first dimming blocks of a reference number or more being arranged adjacent to each other.

As such, the display device may reduce the driving current based on the number and arrangement of the light sources emitting the light of maximum intensity. Accordingly, the display device may accurately predict the local overheating of the light source device.

The reference number may correspond to approximately 10% of the plurality of dimming blocks. Accordingly, local overheating of the light source device due to an image having an APL of 10% may be prevented or suppressed.

The processor may control the driver to supply an increased current to the plurality of light sources based on the number or arrangement of second dimming blocks having an average current value of the reduced currents greater than or equal to a second reference value.

In this way, when the local overheating is not expected, the display device may increase the driving current supplied to the light source. Accordingly, luminance of the display device may be increased, and a contrast ratio of the display device may also be increased.

The processor may control the driver to supply the increased current to the plurality of light sources based on the number of the second dimming blocks being less than a reference number.

As such, the display device may increase the driving current based on the number of the light sources emitting light of corrected maximum intensity without determining the arrangement of the light sources emitting the light of corrected maximum intensity. Accordingly, computational load for determining the arrangement of the light sources emitting light of corrected maximum intensity may be reduced.

In the display device, the processor may control the driver to supply the increased current to the plurality of light sources based on the second dimming blocks of a reference number or more not being arranged adjacent to each other.

As such, the display device may reduce the driving current based on the number and arrangement of the light sources emitting the light of corrected maximum intensity. Accordingly, the display device may improve the luminance and the contrast ratio without the local overheating of the light source device.

The processor may reduce a maximum current value of currents supplied to the plurality of light sources based on the number or arrangement of the first dimming blocks. The processor may increase the reduced maximum current value of the currents supplied to the plurality of light sources based on the number or arrangement of the second dimming blocks having the average current value of the reduced currents being greater than or equal to a second reference value. The first reference value may correspond to the maximum current value, and the second reference value may correspond to the reduced maximum current value. A ratio of the first reference value and the maximum current value may be approximately equal to a ratio of the second reference value and the reduced maximum current value.

As such, the display device may reduce the driving current supplied to the light sources by reducing the maximum current value, and increase the driving current supplied to the light sources by increasing the maximum current value.

The processor may include a memory configured to store a matrix composed of current values of currents supplied to the one or more light sources included in each of the plurality of dimming blocks. The processor may calculate an average of the current values stored in the matrix using an averaging filter.

Accordingly, the display device may calculate the average current value of the currents supplied to the light sources without excessive computational load.

A display device according to an embodiment includes a liquid crystal panel, a light source module including a plurality of light sources capable of emitting light toward the liquid crystal panel, wherein the plurality of light sources are divided into a plurality of dimming blocks each including one or more light sources, a driver configured to supply a current to each of the plurality of light sources, and a processor configured to control the driver to supply the current to the one or more light sources included in each of the plurality of dimming blocks based on image data. The processor may obtain an average current value of currents supplied to the one or more light sources for a reference time included in representative blocks representing each of a plurality of block groups among the dimming blocks based on the image data, and control the driver to supply a reduced current to the plurality of light sources based on the number or arrangement of first dimming blocks in which an average current value is greater than or equal to a first reference value.

Accordingly, local overheating of the light source device due to the local concentration of the light sources emitting the light of maximum intensity may be prevented or suppressed. In addition, the display device may predict the local overheating of the light source device without excessive computational load.

Further, the disclosed embodiments may be implemented in the form of a recording medium storing commands executable by a computer. The commands may be stored in the form of program codes and, when executed by a processor, may generate a program module to perform the operations of the disclosed embodiments. The recording medium may be implemented as a computer-readable recording medium.

The computer-readable recording medium includes all kinds of recording media storing instructions which are decipherable by a computer. For example, there may be a read-only memory (ROM), a random access memory (RAM), a magnetic tape, a magnetic disk, a flash memory, an optical data storage device, and the like.

The computer-readable storage media may be provided in the form of non-transitory storage media. Here, the term "non-transitory" storage medium may mean that the storage medium is a tangible device that does not include a signal (e.g., electromagnetic waves) without distinguishing between storing data in the storage medium semi-permanently and temporarily. For example, the non-transitory storage medium may include a buffer that temporarily stores data.

According to an embodiment, the method according to various embodiments disclosed herein may be included and provided in a computer program product. The computer program product may be a commercial product that may be traded between a seller and a buyer. The computer program product may be distributed in the form of a storage medium (e.g., a compact disc read-only memory (CD-ROM)), through an application store (e.g., play store™), directly between two user devices (e.g., smart phones), or online (e.g., downloaded or uploaded). In the case of online distribution, at least a portion of the computer program product (e.g., a downloadable app) may be at least temporarily stored or arbitrarily created in a storage medium that may be readable to a device, such as a server of the manufacturer, a server of the application store, or a relay server.

Example embodiments have been described above with reference to the accompanying drawings. It would be appreciated by those skilled in the art to which the present disclosure pertains that forms different from the disclosed embodiments may be implemented without departing from the technical spirit and essential features of the disclosed embodiments. The disclosed embodiments are illustrative and should not be construed as limitative.

What is claimed is:

1. A display device comprising:
a liquid crystal panel;
a plurality of light sources configured to emit light toward the liquid crystal panel, wherein the plurality of light sources are divided into a plurality of dimming blocks, each dimming block of the plurality of dimming blocks including one or more light sources;
a driver configured to provide a current to each light source of the plurality of light sources;
memory configured to store instructions; and
a processor configured to execute the instructions to cause the display device to:
control the driver to provide the current to the one or more light sources included in each dimming block of the plurality of dimming blocks based on image data,
obtain an average current value of currents provided to the one or more light sources included in each dimming block of the plurality of dimming blocks for a reference time based on the image data, and
control the driver to provide a reduced current to the plurality of light sources based on at least one of:
a first number of first dimming blocks that have the average current value greater than or equal to a first reference current value, being greater than or equal to a first reference number; or
a second number of the first dimming blocks being arranged adjacent to each other that have the average current value greater than or equal to the first reference current value, being greater than a second reference number.

2. The display device claim 1, wherein the first reference number corresponds to approximately 10% of the plurality of dimming blocks.

3. The display device of claim 1, wherein the processor is further configured to execute the instructions to cause the display device to control the driver to provide an increased current to the plurality of light sources based on at least one of a number of second dimming blocks or an arrangement of the second dimming blocks having an average current value of the reduced currents being greater than or equal to a second reference current value.

4. The display device of claim 3, wherein the processor is further configured to execute the instructions to cause the display device to control the driver to provide the increased current to the plurality of light sources based on the number of the second dimming blocks being less than a third reference number.

5. The display device of claim 3, wherein the processor is further configured to execute the instructions to cause the display device to control the driver to provide the increased current to the plurality of light sources based on at least a fourth reference number of the second dimming blocks not being arranged adjacent to each other.

6. The display device of claim 1, wherein the processor is further configured to execute the instructions to cause the display device to reduce a maximum current value of currents provided to the plurality of light sources based on at least one of the first number of the first dimming blocks or an arrangement of the first dimming blocks.

7. The display device of claim 6, wherein the processor is further configured to execute the instructions to cause the display device to increase the reduced maximum current value of currents provided to the plurality of light sources based on at least one of a predetermined number of second dimming blocks or an arrangement of the second dimming blocks having an average current value of the reduced currents being greater than or equal to a second reference current value.

8. The display device of claim 7, wherein the first reference current value corresponds to the maximum current value, and the second reference current value corresponds to the reduced maximum current value.

9. The display device of claim 8, wherein a ratio of the first reference current value and the maximum current value is approximately equal to a ratio of the second reference current value and the reduced maximum current value.

10. The display device of claim 1, wherein the memory is further configured to store a matrix composed of current values of currents provided to the one or more light sources included in each dimming block of the plurality of dimming blocks.

11. The display device of claim 10, wherein the processor is further configured to execute the instructions to cause the display device to obtain an average of current values stored in the matrix using an averaging filter.

12. A method of controlling a display device, the method comprising:

providing a current to one or more light sources included in each dimming block of a plurality of dimming blocks to emit light toward a liquid crystal panel;

obtaining an average current value of currents provided to the one or more light sources included in each dimming block of the plurality of dimming blocks for a reference time based on image data; and providing a reduced current to the one or more light sources based on at least one of:

a first number of first dimming blocks, having the average current value being greater than or equal to a first reference current value, being greater than or equal to a first reference number: or a second number of the first dimming blocks being arranged adjacent to each other that have the average current value being greater than or equal to the first reference current value, being greater than a second reference number.

\* \* \* \* \*